US010863810B1

(12) United States Patent
Baccellieri

(10) Patent No.: US 10,863,810 B1
(45) Date of Patent: Dec. 15, 2020

(54) MODULAR FIREARM SUPPORT, CONCEALMENT AID, AND SHOOTING EQUIPMENT HOLDER ASSEMBLY FOR A MULTI-LEGGED STAND

(71) Applicant: Michael R. Baccellieri, Beaverton, OR (US)

(72) Inventor: Michael R. Baccellieri, Beaverton, OR (US)

(*) Notice: Subject to any disclaimer, the term of this patent is extended or adjusted under 35 U.S.C. 154(b) by 0 days.

(21) Appl. No.: 16/849,822

(22) Filed: Apr. 15, 2020

Related U.S. Application Data

(60) Provisional application No. 62/834,455, filed on Apr. 16, 2019.

(51) Int. Cl.
| | |
|---|---|
| *A45C 15/00* | (2006.01) |
| *F41A 23/14* | (2006.01) |
| *F16M 11/32* | (2006.01) |
| *A45C 13/10* | (2006.01) |
| *A45C 13/30* | (2006.01) |
| *A45C 3/00* | (2006.01) |

(52) U.S. Cl.
CPC ............... *A45C 15/00* (2013.01); *A45C 3/00* (2013.01); *A45C 13/1023* (2013.01); *A45C 13/30* (2013.01); *F16M 11/32* (2013.01); *F41A 23/14* (2013.01); *F16M 2200/08* (2013.01)

(58) Field of Classification Search
CPC .......... F16M 11/00–425; F16M 13/04; F16M 11/04–14; F16M 11/32; F16M 2200/08; A45F 2200/0533; A45C 15/00; A45C 3/00; A45C 13/1023; A45C 13/30; F41A 23/14

USPC ............. 248/525, 163.1, 431, 168, 173
See application file for complete search history.

(56) References Cited

U.S. PATENT DOCUMENTS

| | | | | |
|---|---|---|---|---|
| 3,334,856 | A * | 8/1967 | Corey ............... | F16M 11/242 248/466 |
| 4,114,667 | A * | 9/1978 | Belson ............... | A45C 11/38 224/613 |
| 6,174,266 | B1 * | 1/2001 | Merrill ............... | A63B 9/00 248/431 |
| 7,367,617 | B1 * | 5/2008 | Bond ............... | A47C 4/286 248/431 |
| 2008/0302436 | A1 * | 12/2008 | Elowitz ............... | G03B 17/561 138/110 |
| 2011/0260016 | A1 * | 10/2011 | Johnson ............... | F16M 11/16 248/168 |

* cited by examiner

*Primary Examiner* — Muhammad Ijaz
(74) *Attorney, Agent, or Firm* — Eric B. Fugett; Mark A. Pitchford; Pitchford Fugett, PLLC

(57) ABSTRACT

A modular firearm support, concealment aid, and shooting equipment holder assembly for a multi-legged stand comprises a plurality of flexible leg sleeves configured to releasably engage different legs of the multi-legged stand, and at least one flexible wall panel configured to extend between and releasably engage any two adjacent leg sleeves of the plurality. The wall panel includes a plurality of rows of uniformly spaced, laser-cut, horizontal slots defined therethrough. When secured to an adjacent pair of leg sleeves mounted on a deployed multi-legged stand, the wall panel screens an interior space defined between the legs of the stand from a viewpoint outboard of the wall panel, and provides an upright, load bearing surface to which a user can mount an item of modular light-weight load-carrying equipment (MOLLE).

23 Claims, 22 Drawing Sheets

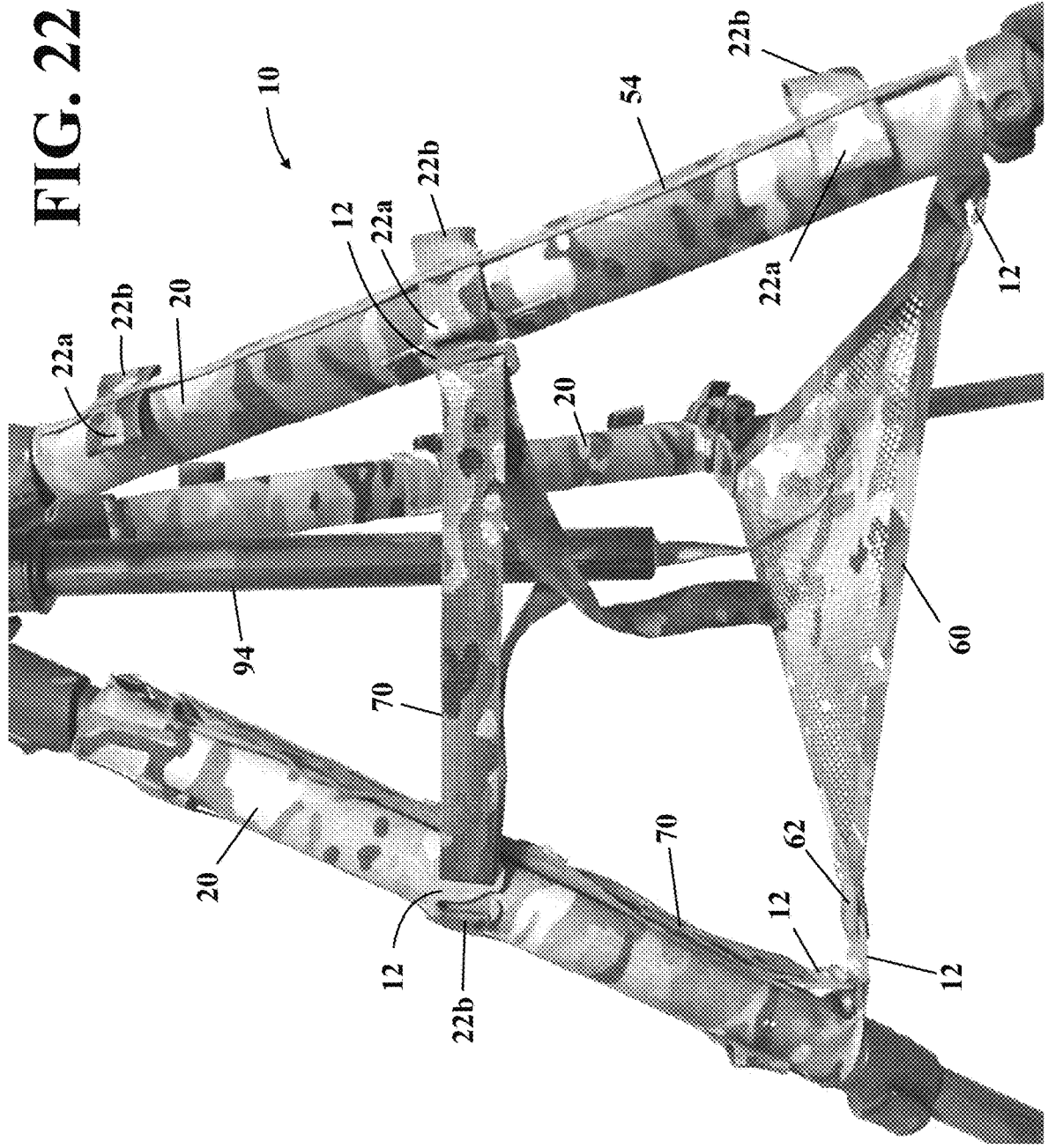

MODULAR FIREARM SUPPORT, CONCEALMENT AID, AND SHOOTING EQUIPMENT HOLDER ASSEMBLY FOR A MULTI-LEGGED STAND

CROSS-REFERENCES TO RELATED APPLICATIONS

This application claims priority to U.S. Provisional Application Ser. No. 62/834,455, filed Apr. 16, 2019 and titled "SUPPORT AND ACCESSORY HOLDER FOR A MULTI-LEGGED STAND," the entire disclosure of which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND OF THE INVENTION

The present invention relates generally to multi-legged stands. More particularly, the invention relates to assemblies for mounting and concealing items on portable multi-legged stands.

Portable multi-legged stands such as bipods and tripods are used to support the weight and maintain the stability of some other object, including objects that are too heavy and/or too bulky for the average person to steadily hold unaided. Multi-legged stands provide stability against downward forces, horizontal forces, and movements about horizontal axes, including those resulting from forces generated by the object. Many modern portable multi-legged stands are both light weight and collapsible. Collapsible stands have independently telescopic legs designed to be extended in use and collapsed in order to save space when not in use. The extendable legs of collapsible stands allow a user to independently vary the length of each leg to accommodate unlevel terrain and thereby precisely level or otherwise position an object supported by the stand. For these reasons, multi-legged stands are used in a wide variety of applications where it is necessary or desirable for a user to stabilize an object in one or more axes of movement. For example, military personnel, hunters, competitive shooters, surveyors, and photographers, among others, frequently use multi-legged stands to support and stabilize such items as firearms, spotting scopes, surveying instruments, cameras, and the like.

In the context of precision shooting, marksmen around the world regularly employ multi-legged stands as a forward rest for their rifles to minimize shake, reduce recoil, and thus increase accuracy of shot placement. However, the vocational requirements of certain military members, such as snipers and designated marksmen, generally require more than a simple platform from which to deliver long-range fire or conduct reconnaissance. For example, such personnel must generally be able to rapidly take-down, relocate, and redeploy their stands and weapons in order to remain operational in different tactical situations and environments. In addition to their firearm, such personnel typically require and employ a variety of sensitive optics, communication, and navigation equipment while conducting operations in which remaining concealed and being able to immediately and repeatedly access such equipment is critical.

However, currently available multi-legged stands typically do not provide a user with onboard storage space for temporarily stowing frequently-used shooting equipment or related gear, much less stowing gear in a readily accessible location. Nor do available stands protect such equipment from inclement weather or accidental physical damage, or conceal the equipment or user. Another problem with available multi-legged stands is that they can easily topple if not properly deployed or anchored, whether or not the stand includes integral stabilizers.

Accordingly, what is needed are improvements in multi-legged stands.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The presently disclosed subject matter overcomes or minimizes some or all of the identified deficiencies of the prior art, as will become evident to those of ordinary skill in the art after a study of the information presented in this document.

Disclosed herein is a modular firearm support, concealment aid, and shooting equipment holder assembly for multi-legged stands. The assembly includes at least two interchangeable, flexible leg sleeves, at least one flexible wall panel, and, in some embodiments, a mesh floor panel, which can be assembled and mounted on a multi-legged stand, such as a tripod, in a variety of different configurations customizable by a user for different applications in which it is desirable or necessary to mount items of shooting equipment (or other equipment) on the stand and thereby conceal the items and the user.

Accordingly, in one aspect, the disclosure provides an assembly for mounting and concealing items on a tripod. The assembly comprises at least two flexible leg sleeves configured to wrap around and releasably engage a leg of the tripod, a plurality of primary anchor tabs secured to an exterior surface of each leg sleeve, at least one flexible wall panel having a plurality of rows of uniformly spaced horizontal slots defined therein, a plurality of straps extending from each of a left side and a right side of the wall panel, and a plurality of releasable wall panel fasteners connected to the plurality of straps. The wall panel fasteners are removably receivable in the primary anchor tabs to secure the wall panel to an adjacent pair of leg sleeves. The wall panel screens a portion of an interior space defined between the legs of the tripod from a viewpoint outboard of the wall panel, and provides an upright, load bearing surface to which a user can selectably mount an item of modular light-weight load-carrying equipment (MOLLE) when each of the leg sleeves is engaged with a different leg of the tripod, the plurality of wall panel fasteners are received in the primary anchor tabs of the leg sleeves, and the tripod is in a deployed position.

In another aspect, the disclosure provides an assembly for mounting and concealing items on a multi-legged stand, comprising a plurality of leg sleeves configured to be wrapped around and thereby releasably engaged with a different leg of the multi-legged stand, a flexible wall panel configured to extend between and releasably engage two leg sleeves of the plurality of leg sleeves to selectably secure the wall panel to the two leg sleeves, and a plurality of rows of uniformly spaced horizontal slots defined through the wall panel, wherein the wall panel provides an upright, load bearing surface to which a user can selectably mount an item of modular light weight load-carrying equipment (MOLLE) when the wall panel is engaged with the two leg sleeves, the two leg sleeves are engaged with two adjacent legs of the multi-legged stand, and the multi-legged stand is in a deployed position.

In yet another aspect, the disclosure provides an assembly for mounting and concealing items on a multi-legged stand, comprising a pair of flexible leg sleeves configured to wrap around and releasably engage one leg of a pair of adjacent legs of the multi-legged stand, a plurality of anchor loops secured to an exterior surface of each leg sleeve, a flexible wall panel having a left side, a right side, and a plurality of straps extending from each of the left and right sides, and a plurality of G-hook buckles connected to the plurality of straps and removably receivable in a different anchor loop of the plurality of anchor loops to secure the wall panel to the pair of leg sleeves, wherein the flexible wall panel is sized and shaped to substantially fill a space defined between the pair of leg sleeves when the pair of leg sleeves are engaged with the pair of adjacent legs and the multi-legged stand is in a deployed position such that the wall panel screens an object located on a first side of the wall panel from a viewpoint located on a second side of the wall panel.

In still yet another aspect, the disclosure provides a multi-legged stand for supporting a firearm and mounting and concealing shooting equipment, the stand comprising a portable tripod having three telescopic legs that define an interior space when deployed; three flexible leg sleeves configured to wrap around and releasably engage a different leg of the tripod; a plurality of pairs of left and right anchor loops secured to an outboard portion of the exterior surface of each leg sleeve facing away from the interior space when each leg sleeve is engaged with a corresponding leg of the tripod, wherein each anchor loop defines an axis extending substantially parallel to an axis of each leg when the corresponding leg sleeve to which the left and right anchor loops is engaged with a corresponding leg of the tripod; a flexible wall panel having a plurality of rows of uniformly spaced horizontal slots defined therethrough; a plurality of straps extending from each of a left side and a right side of the wall panel; a plurality of G-hook buckles, each buckle connected to a different strap of the plurality of straps, wherein the G-hook buckles connected to the plurality of straps extending from the left side of the wall panel are removably receivable in the right anchor loops of a first of the three leg sleeves to secure the left side of the wall panel to the first leg sleeve, and the G-hook buckles connected to the plurality of straps extending from the right side of the wall panel are removably receivable in the left anchor loops of a second of the three leg sleeves to secure the right side of the wall panel to the second leg sleeve; a flexible floor panel having three vertexes; a floor panel strap secured to each vertex of the floor panel; a secondary anchor loop secured to an inboard portion of the lower end of each leg sleeve facing the interior space when the leg sleeve is engaged with a corresponding leg of the tripod, wherein each secondary anchor loop defines an axis extending parallel to the ground when the leg sleeve to which the secondary anchor loop is secured is engaged with a corresponding leg of the tripod; and a G-hook buckle connected to each floor panel strap, each G-hook buckle removably receivable in the secondary anchor loop of a different leg sleeve to secure the floor panel to the leg sleeves; wherein the wall panel screens an object stowed on the floor panel from a viewpoint outboard of the wall panel, and provides an upright, load bearing surface to which a user can selectably mount an item of modular light-weight load-carrying equipment (MOLLE) when each of the leg sleeves is engaged with a different leg of the tripod, the G-hook buckles connected to the floor panel straps are received in the corresponding secondary anchor loops, the G-hook buckles connected to the wall panel straps are received in the corresponding left and right anchor loops, and the tripod is in a deployed position.

Numerous other objects, advantages and features of the present disclosure will be readily apparent to those of skill in the art upon a review of the following drawings and description of a preferred embodiment.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various drawings unless otherwise specified. In the drawings, not all reference numbers are included in each drawing, for the sake of clarity.

FIG. 22 is a perspective detail view of the assembly of FIG. 6 with the wall panels removed to show an accessory strap in a deployed position wherein each releasble fastener is received in a primary anchor loop of the left and right leg sleeves located in the middle of the length of each leg sleeve.

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

To facilitate the understanding of the embodiments described herein, a number of terms are defined below. The terms defined herein have meanings as commonly understood by a person of ordinary skill in the portions relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

This description and appended claims include the words "below", "above", "side", "top", "bottom", "upper", "lower", "when", "vertical", "horizontal", "upright", etc. to provide an orientation of embodiments of the invention to allow for proper description of example embodiments. The foregoing positional terms refer to the assembly when in the orientation shown in FIG. 1. A person of skill in the art will recognize that the assembly can assume different orientations when in use.

Figure 1:
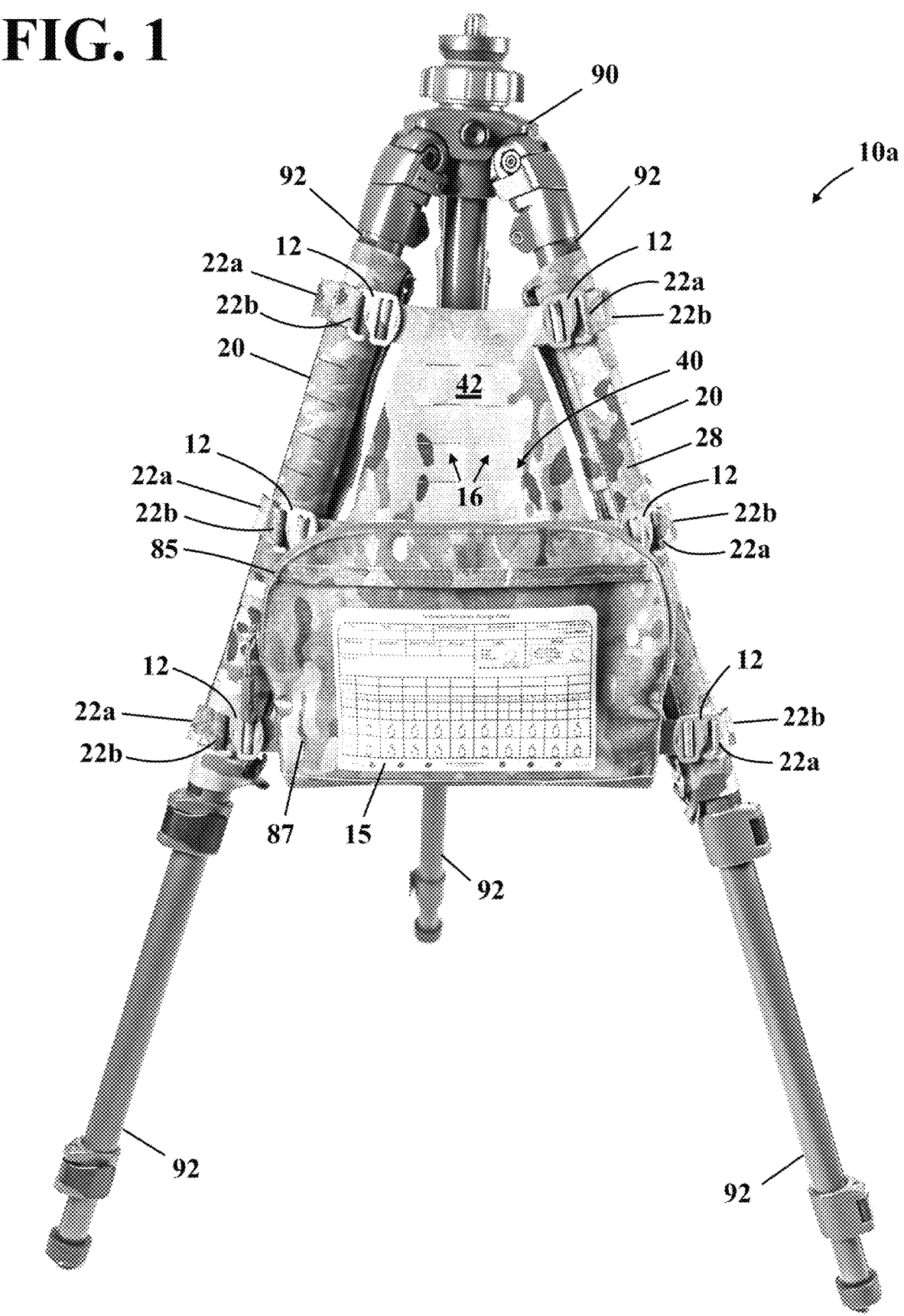
FIG. 1 is a front perspective view of an embodiment of an assembly for mounting and concealing items on a multi-legged stand showing the assembly with two identical leg sleeves releasably engaged with two adjacent legs of a tripod, a flexible wall panel releasably engaged with and substantially filling the space between the leg sleeves, and an item of modular, light weight load-bearing equipment (MOLLE) in the form of a flexible pouch with a clear front pocket releasably secured to the front surface of the wall panel.

Similarly, an "upright" position as described herein is considered to be the position of the apparatus or assembly components while in proper operation or in a natural resting position as described and shown herein, for example, in FIG. 1. It is also contemplated that embodiments of the invention may be in orientations other than upright without departing from the spirit and scope of the invention as set forth in the appended claims. Further, the terms "above", "below", "over", and "under" mean "having an elevation or vertical height greater or lesser than" and are not intended to imply that one object or component is directly over or under another object or component. The term "when" is used to specify orientation for relative positions of components, not as a temporal limitation of the claims or apparatus described and claimed herein unless otherwise specified.

The term "inboard", when used to indicate a specific location (e.g., "on an inboard surface of an object"), means a location that faces an interior space defined between the legs of a multi-legged stand. Conversely, the term "outboard", when used to indicate a specific location (e.g., "on an outboard surface of an object") means a location that faces away from an interior space defined between the legs of a multi-legged stand. Furthermore, the term "inboard", when used as a relative term to indicate a location relative to a reference point (e.g., "secured to a surface inboard of a reference point") means a location that is closer to facing an interior space defined between the legs of a multi-legged stand than the reference point, but does not necessarily require that the indicated location directly faces the interior space. Likewise, the term "outboard", when used as a relative term to indicate a location relative to a reference point (e.g., "secured to a surface outboard of a reference point") means a location that is closer to facing away from an interior space defined between the legs of a multi-legged stand than the reference point, but does not necessarily require that the indicated location faces directly away from the interior space.

The term "MOLLE" as used herein is a well-known acronym used by the United States military which refers to modular light-weight load-carrying equipment. Common items of MOLLE include backpacks, hydration bladders, holsters, and pouches for holding such equipment as ammunition magazines, holsters, rations, handheld GPS, batons, flares, grenades, binoculars, handcuffs, and the like. Items of MOLLE are designed to be secured to corresponding grids of webbing, known as a Pouch Attachment Ladder System, "PALS webbing", and a "PALS ladder", by webbing or clips.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Referring now to FIGS. 1-9, there is shown four embodiments of a modular firearm support, concealment aid, and shooting equipment holder assembly for mounting and concealing items on a multi-legged stand, such as a tripod 90, formed in accordance with the present disclosure. The assemblies disclosed herein are designed to add minimal weight and negligible mass to a user's tripod. Each embodiment and component part or subassembly thereof is specifically described in detail below.

In a first embodiment, shown in FIG. 1, the assembly 10a includes two elongated leg sleeves 20 and one wall panel 40. Each leg sleeve 20 is wrapped around and releasably engaged with the uppermost portion of an adjacent leg 92 of the tripod 90 (i.e., the upper leg section into which the lower extendable portion of the legs retract). Each leg sleeve 20 is mounted on the uppermost portion of the legs 92 of the tripod 90 so as not to interfere with or limit the telescoping capabilities of the tripod legs 92. The wall panel 40 is releasably attached to each of the two leg sleeves 20 and substantially fills a planar space defined between the two leg sleeves 20, as shown in FIG. 1. By "substantially fills" the planar space it is meant that the wall panel 40 leaves a gap between each lateral side of the wall panel 40 and the corresponding leg sleeve 20 having a width of no more than about 1.5 inches.

Figure 2:
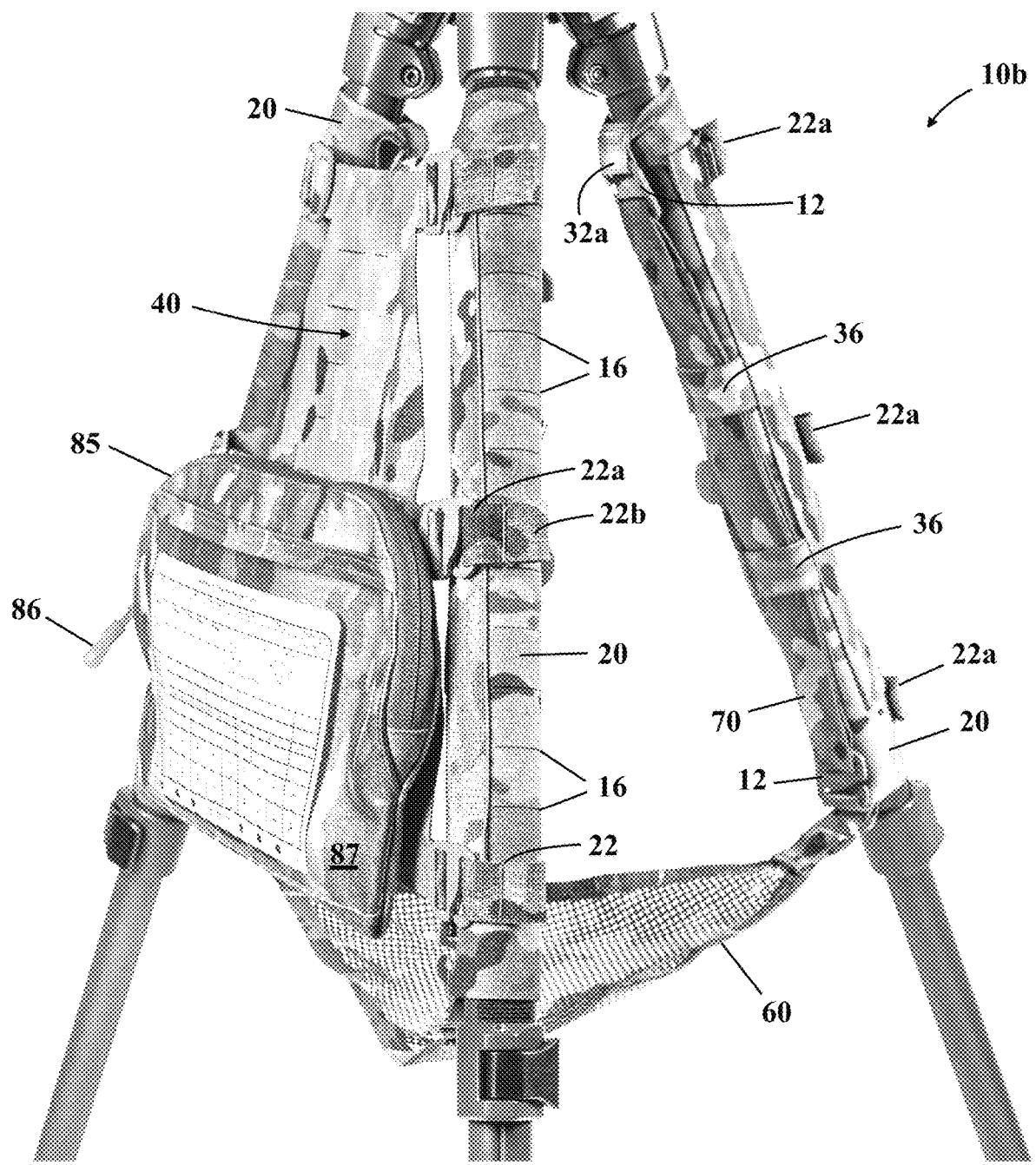
FIG. 2 is a perspective view of another embodiment of an assembly for mounting and concealing items on a multi-legged stand showing the assembly with three identical leg sleeves releasably engaged with the legs of a tripod, a flexible wall panel releasably engaged with and substantially filling the space between two of the leg sleeves, and a triangular floor panel formed from a flexible mesh material releasably secured to a lower end of each leg sleeve.
Figure 3:
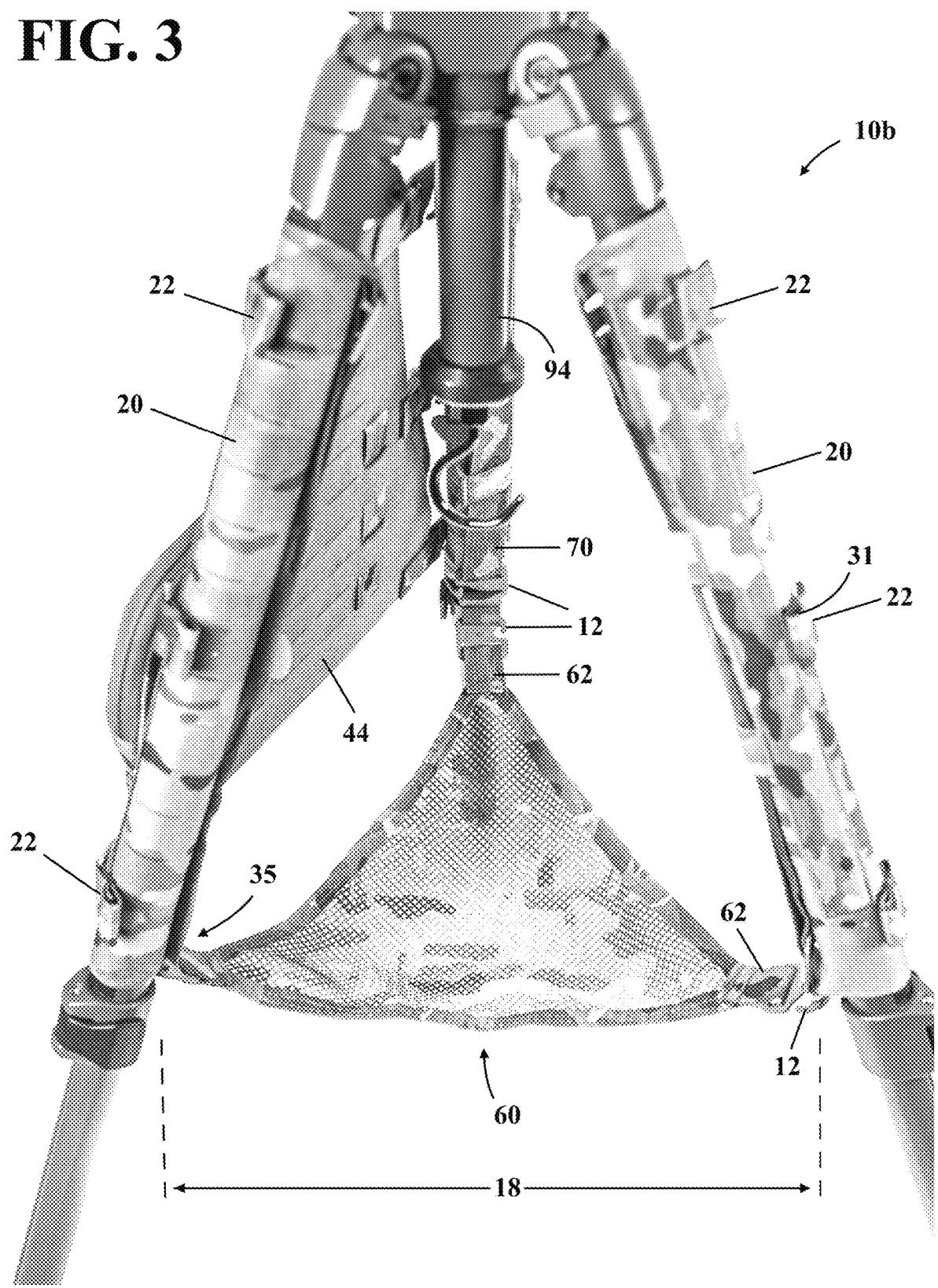
FIG. 3 is another perspective view of the assembly of FIG. 2. showing a strap extending from each vertex of the triangular floor panel, a releasable fastener connected to each strap, and each fastener received in a horizontal loop secured to a lower end of each leg sleeve. The loop defines an axis extending parallel relative to the ground.

As depicted in FIGS. 2-9, other embodiments of the assembly 10a can include a greater number of identical leg sleeves 20 or wall panels 40, or both, as well as a flexible floor panel 60. For example, FIGS. 2-3 depict a second embodiment of an assembly 10b for mounting and concealing items on a multi-legged stand alike in all respects to assembly 10a except as specifically hereinafter described. Specifically, assembly 10b includes three identical leg sleeves 20 wrapped around and releasably engaged with a different leg 92 of the tripod 90, one wall panel 40 releasably attached to two of the leg sleeves 20, and one floor panel 60 releasably attached to each of the three leg sleeves 20.

Figure 4:
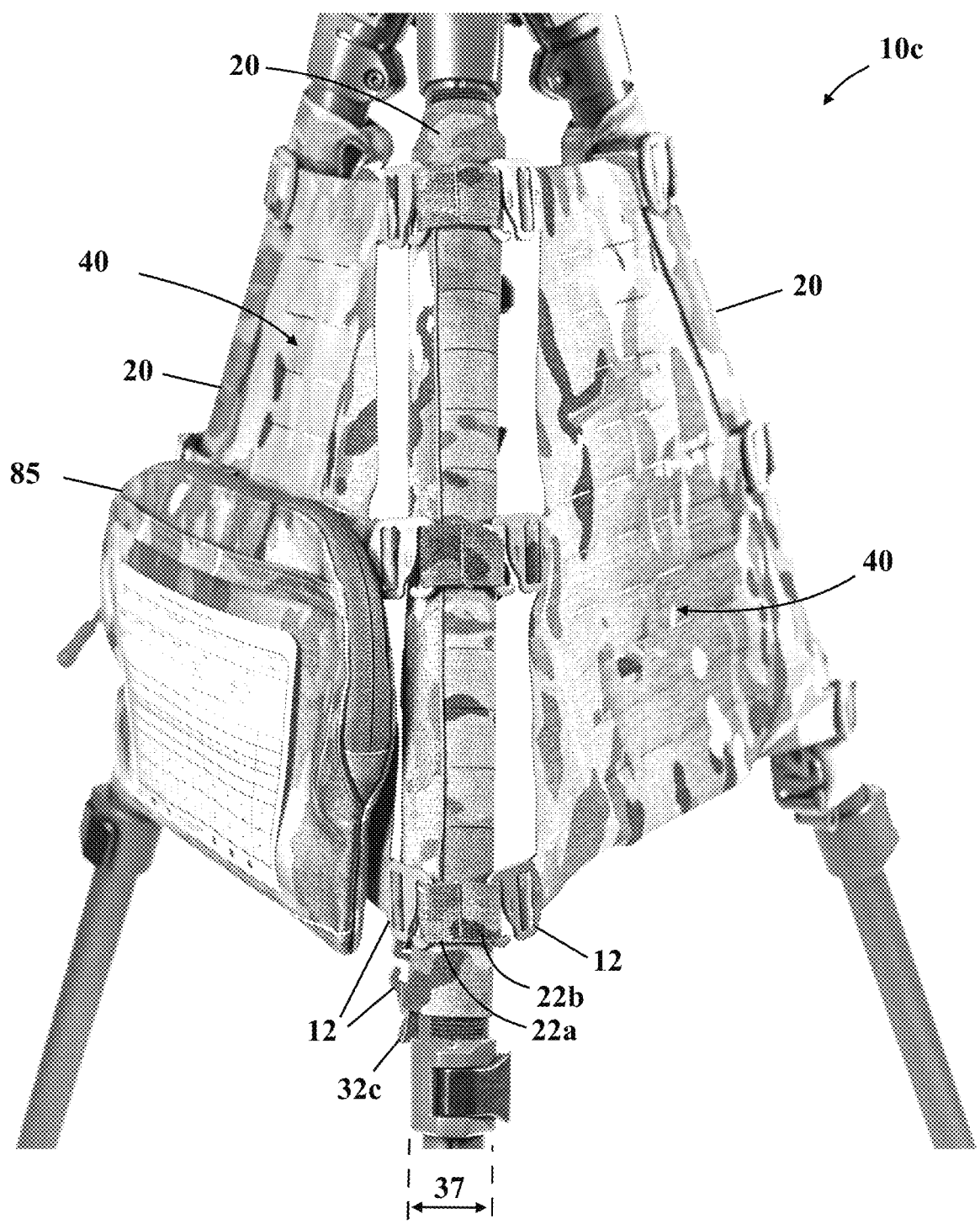
FIG. 4 is a perspective view of another embodiment of an assembly for mounting and concealing items on a multi-legged stand showing the assembly configured with three identical leg sleeves releasably engaged with the legs of a tripod, two identical flexible wall panels releasably engaged with and substantially filling the space between two pairs of adjacent leg sleeves, and a flexible pouch with a clear front pocket releasably secured to the front surface of the left wall panel.
Figure 5:
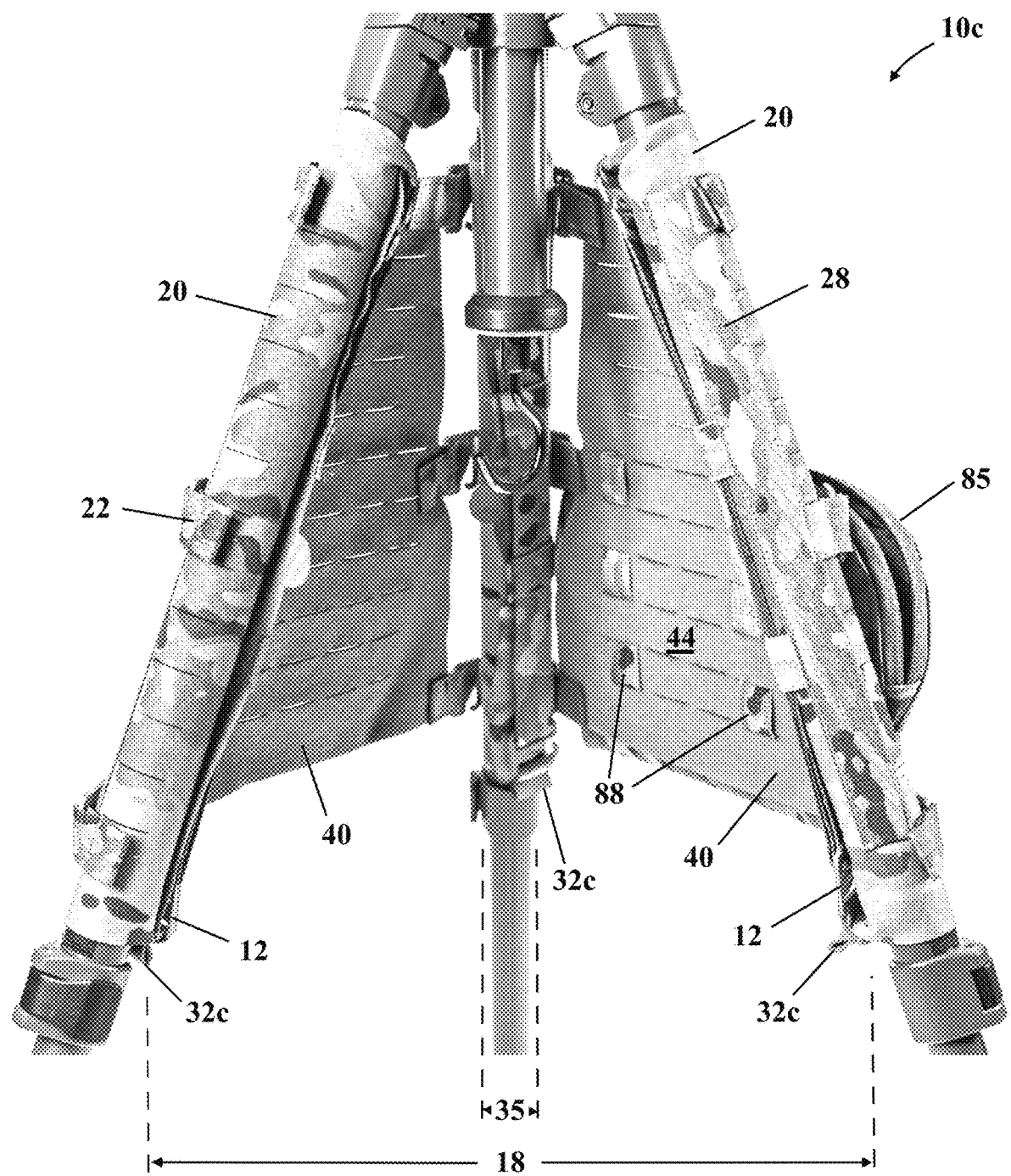
FIG. 5 is a rear perspective view of the assembly of FIG. 4.

FIGS. 4-5 depict a third embodiment of an assembly 10c for mounting and concealing items on a multi-legged stand alike in all respects to assembly 10a except as specifically hereinafter described. Specifically, assembly 10c includes three identical leg sleeves 20 wrapped around and releasably engaged with a different leg 92 of the tripod 90 and two identical wall panels 40. Each wall panel 40 is releasably attached to two of the leg sleeves 20.

Notably, as best shown in FIG. 4, each wall panel 40 is attached to the foremost leg sleeve 20 as well as a different rear leg sleeve 20 to which the other wall panel 40 is not attached. As such, each wall panel 40 is attached to what is termed herein as an "adjacent pair" of leg sleeves 20. For example, the left rear and foremost middle leg sleeves 20 shown in FIG. 4 form a first pair of leg sleeves, and the foremost middle and right rear leg sleeves 20 form a second pair leg sleeves adjacent to the first pair of leg sleeves. Accordingly, when a wall panel 40 is identified herein as being attached to a "a pair of leg sleeves", it is to be understood that the wall panel is attached to two leg sleeves 20 that are adjacent to one another when mounted on corresponding legs of a multi-legged stand 90. Similarly, when two wall panels 40 are identified herein as being attached to "adjacent pairs of leg sleeves", it is to be understood that the two wall panels share a connection to one leg sleeve positioned between them. Likewise, when two wall panels are identified herein as being adjacent to each other, it is to be understood that each of the two wall panels is connected to one leg sleeve positioned between them.

Figure 6:
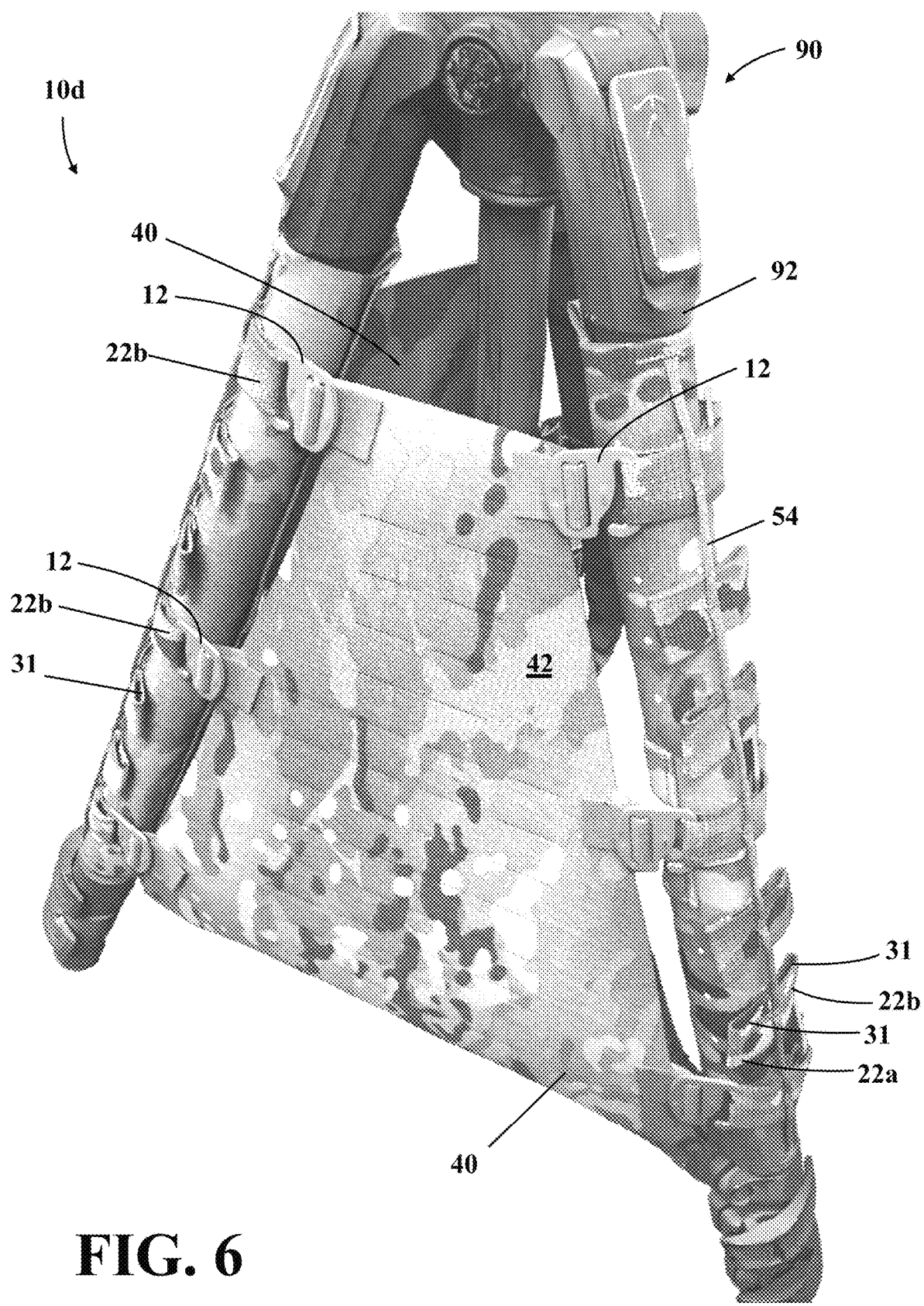
FIG. 6 is a perspective view of another embodiment of an assembly for mounting and concealing items on a multi-legged stand showing the assembly with three identical leg sleeves releasably engaged with the legs of a tripod, three identical flexible wall panels releasably engaged with and substantially filling the space between each pair of adjacent leg sleeves, and a flexible floor panel releasably secured to a lower end of each leg sleeve.
Figure 7:
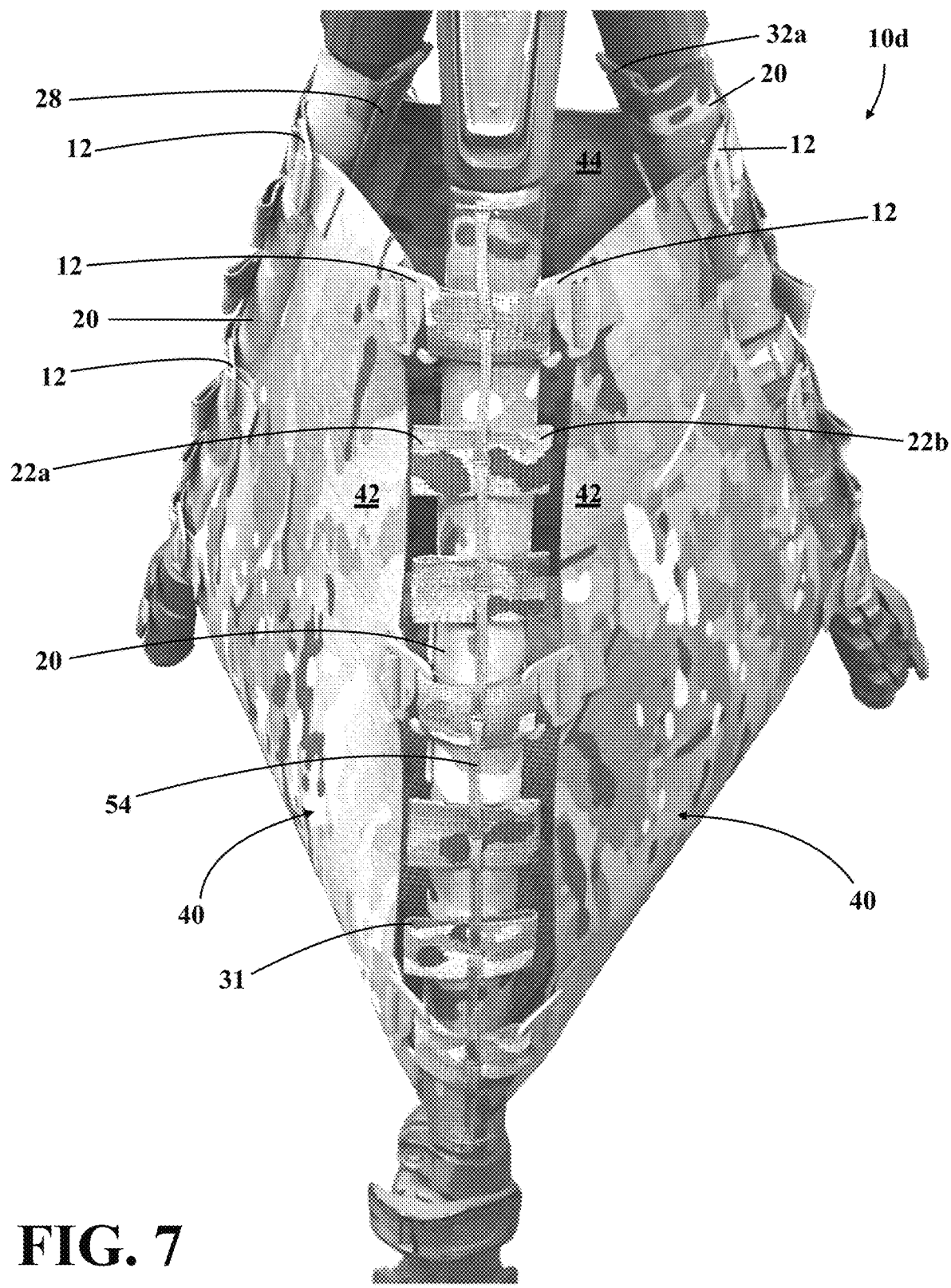
FIG. 7 is another perspective view of the assembly of FIG. 6.
Figure 8:
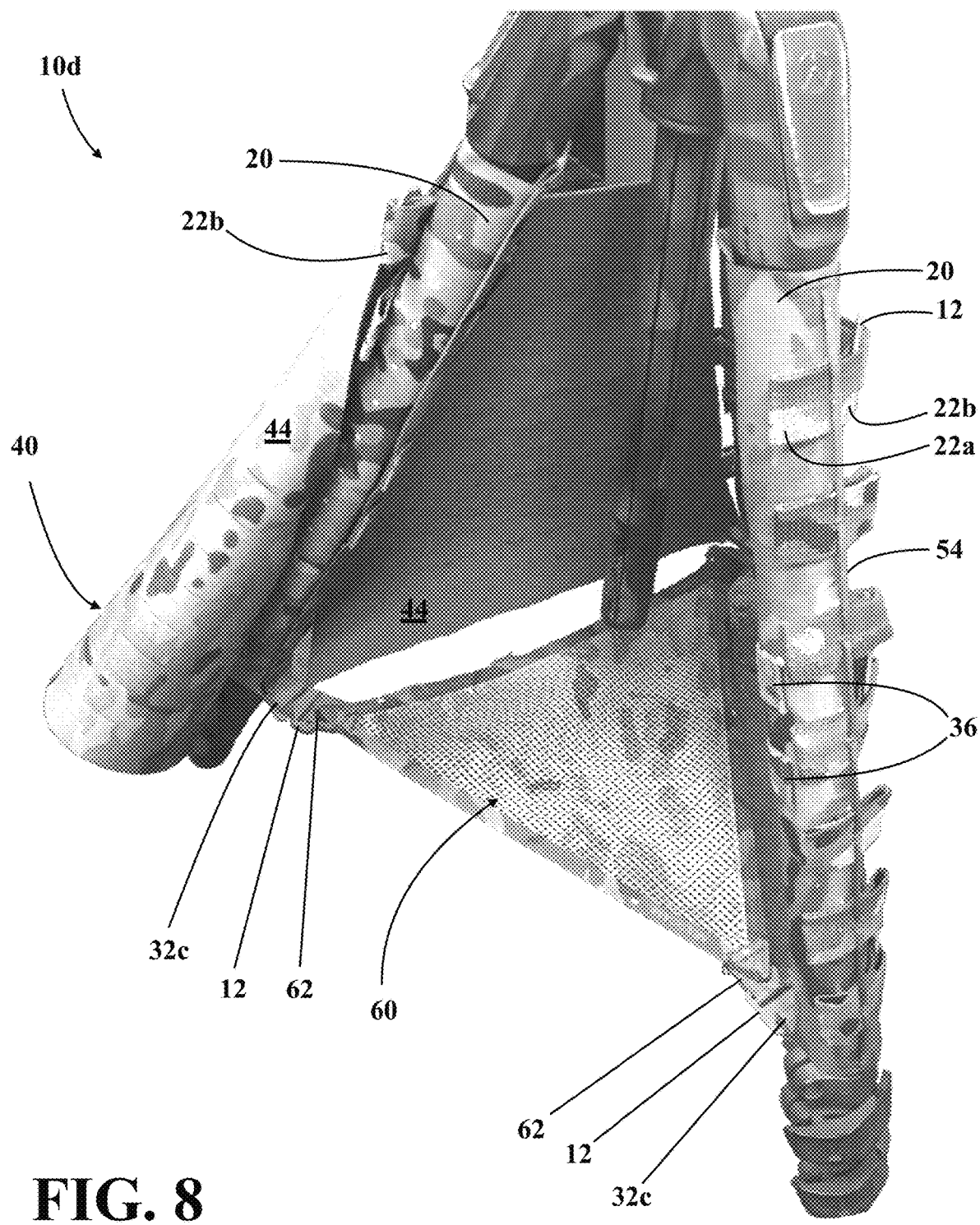
FIG. 8 is another perspective view of the assembly of FIG. 6 showing the right side of one wall panel detached from the foremost leg sleeve and rolled back to reveal the interior space defined between the tripod legs.
Figure 9:
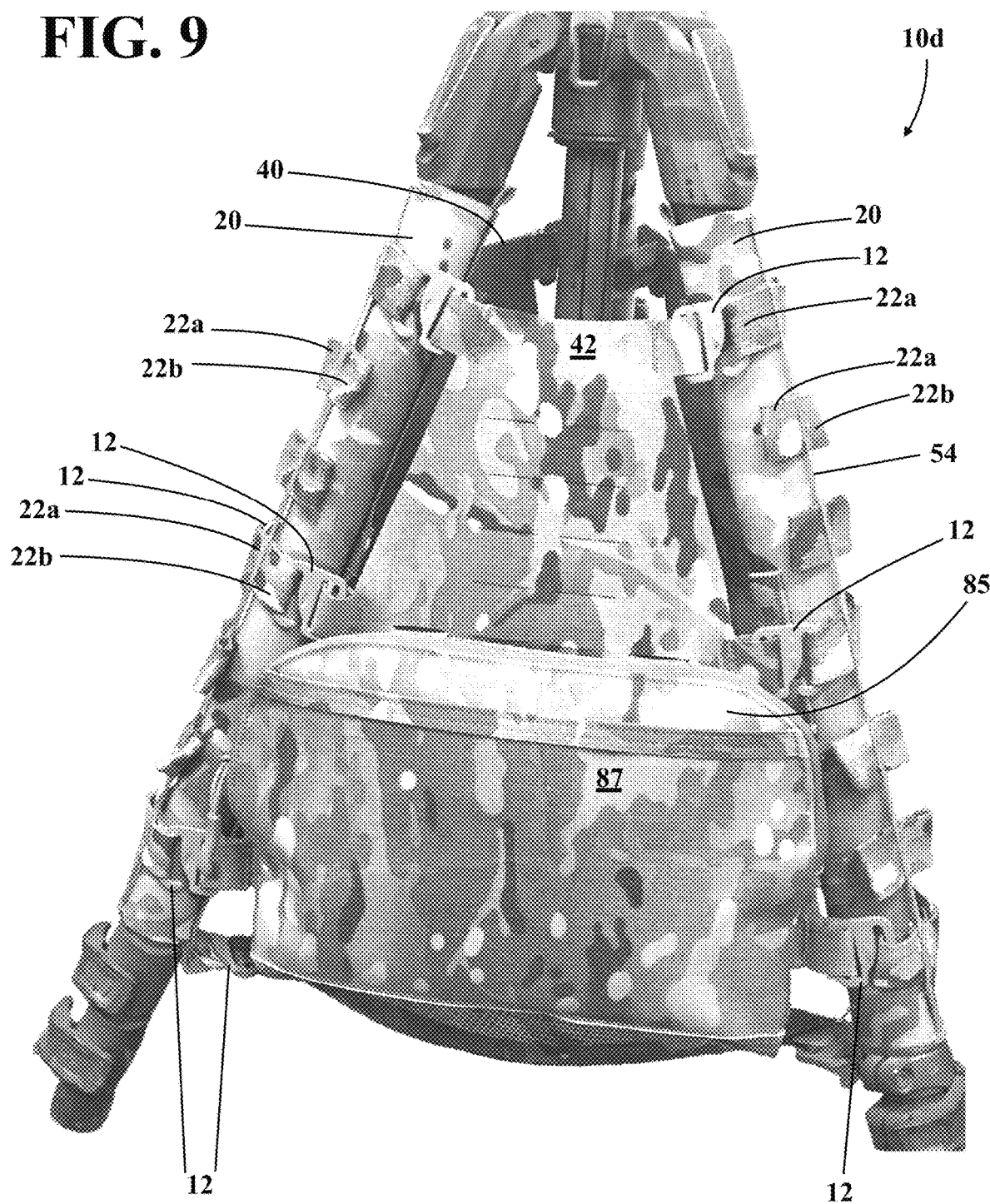
FIG. 9 is another perspective view of the assembly of FIG. 6 showing the assembly with a flexible MOLLE pouch having a clear front pocket secured to the front surface of the foremost wall panel.

FIGS. 6-9 depict a fourth embodiment of an assembly 10d for mounting and concealing items on a multi-legged stand alike in all respects to assembly 10a except as specifically hereinafter described. Specifically, assembly 10d includes three identical leg sleeves 20 wrapped around and releasably engaged with a different leg 92 of the tripod 90, three identical wall panels 40, and one floor panel 60. As best shown in FIGS. 6-7, each wall panel 40 is releasably attached to an adjacent pair of leg sleeves 20 as previously described. The floor panel 60 is releasably secured to each of the three leg sleeves 20.

Assemblies of the present invention, when assembled and mounted on a deployed tripod 90 or other multi-legged stand as disclosed herein, both support and stabilize the tripod, and simultaneously provide upright, load bearing surfaces (via a wall panel 40) on which a user can selectably position and mount one or more items of modular light-weight load-carrying equipment (MOLLE) such as different kinds of pouches 50, 85, for holding and carrying such objects as binoculars, range finders, ammunition magazines, hearing protection, suppressors, extra barrels, handheld GPS, extra camera lenses, or other gear. This enables a user to precisely position important gear around the tripod where it is readily accessible by the user when the user is using the tripod for a preselected application. For example, a right-handed shooter may prefer to position and secure an ammunition magazine pouch containing an extra ammunition magazine on a portion of a wall panel located to the left of the shooter, whereas a shorter left-handed shooter may prefer to position and secure such a pouch on a relatively lower portion of the wall panel located to the right of the shooter.

Notably, the mechanisms by which the leg sleeves 20 are releasably engaged with the legs 92 of the tripod 90 and by which the wall panels 40 are releasably engaged with the leg sleeves 20 (described in more detail below) must be manually disengaged in order to release the leg sleeves 20 from the tripod 90 or to release the wall panels 40 from the leg sleeves 20. This enables a user to quickly and easily relocate and redeploy a tripod or other stand to which an assembly disclosed herein is mounted without having to disconnect, reposition, and reconnect any components of the assembly or any items of MOLLE (and thus vital gear contained therein) secured thereto. Put differently, once a user has fully assembled and mounted an assembly on a stand and secured to the assembly one or more items of MOLLE containing pieces of gear in a desired configuration, the user need not disassemble the assembly before moving the stand. This allows a user to quickly and easily relocate the stand while maintaining all of the user's gear in a predetermined configuration, which is especially advantageous for military personnel for whom repeatability and economy of movement are often key to operational success.

The wall panel(s) 40 of the assemblies disclosed herein can also screen and conceal all or part of an object or person located behind the wall panel(s) from a viewpoint located forward of the wall panel(s), which is extremely beneficial to users of multi-legged stands for whom remaining concealed is critical, such as, military personnel tasked with delivering long-range fire or conducting reconnaissance. For example, the torso of a sharpshooter attempting to deliver fire downrange with a rifle mounted on a tripod to which is attached an assembly disclosed herein will be largely if not completely concealed from view downrange.

Embodiments of the the assemblies disclosed herein which include a floor panel 60 further increase the diversity of applications in which a multi-legged stand is useful. Specifically, when engaged with the leg sleeves 20 as depicted, for example, in FIGS. 2-3, the floor panel 60 provides an elevated, horizontal, load bearing-surface in the form of a conveniently located and easy to access shelf or hammock upon which frequently used, fragile, or sensitive items can be safely stowed, raised off the ground, concealed, and protected from inclement weather and accidental percussive damage when not in use.

The floor panel 60 is beneficially attached to an inboard portion 35 of the exterior surface 24 of each leg sleeve 20 so that the floor panel 60, when in use, is located inside an interior space 18 defined between the legs 92 of the stand 90 when the stand is in a deployed position, as exemplified in FIGS. 2-3. As such, embodiments of the assemblies disclosed herein that include a number of leg sleeves 20 and wall panels 40 equal to the number of legs on a multi-legged stand 90 to which the assembly is desired to be mounted enable a user to completely enclose the interior spaced 18, and thereby completely conceal an object stowed on the floor panel 60, as exemplified by assembly 10d depicted in FIGS. 6-8.

Although the assemblies disclosed herein are shown in each of FIGS. 1-9 mounted on a telescoping tripod 90 with the extendable portions of each leg 92 deployed, it should be understood that embodiments of the assembly 10 can also be constructed with a different number of leg sleeves 20 and wall panels 40 in order to accommodate other telescoping and non-telescoping multi-legged stands having fewer or a greater number of legs than a tripod (e.g., two legs, four legs, five legs, etc.).

The use of identical, modular leg sleeves, wall panels, and floor panels, with identical anchor loops, straps, and releasable fasteners (all described below), advantageously makes the assemblies disclosed herein more convenient and repeatable to set-up and use, as well as easier and less costly to manufacture and repair. For example, most components and subassemblies of the assemblies disclosed herein can be repaired in the field with a length of spare webbing, a needle, and thread or similar material.

Additionally, the number and placement of anchor loops, slots, webbing, and cordage around the assemblies disclosed herein facilitates creation of a hide to conceal the user and the assembly itself, by providing convenient jute tying points to which a user can attach vegetation or other concealment material.

Leg Sleeves

Figure 10:
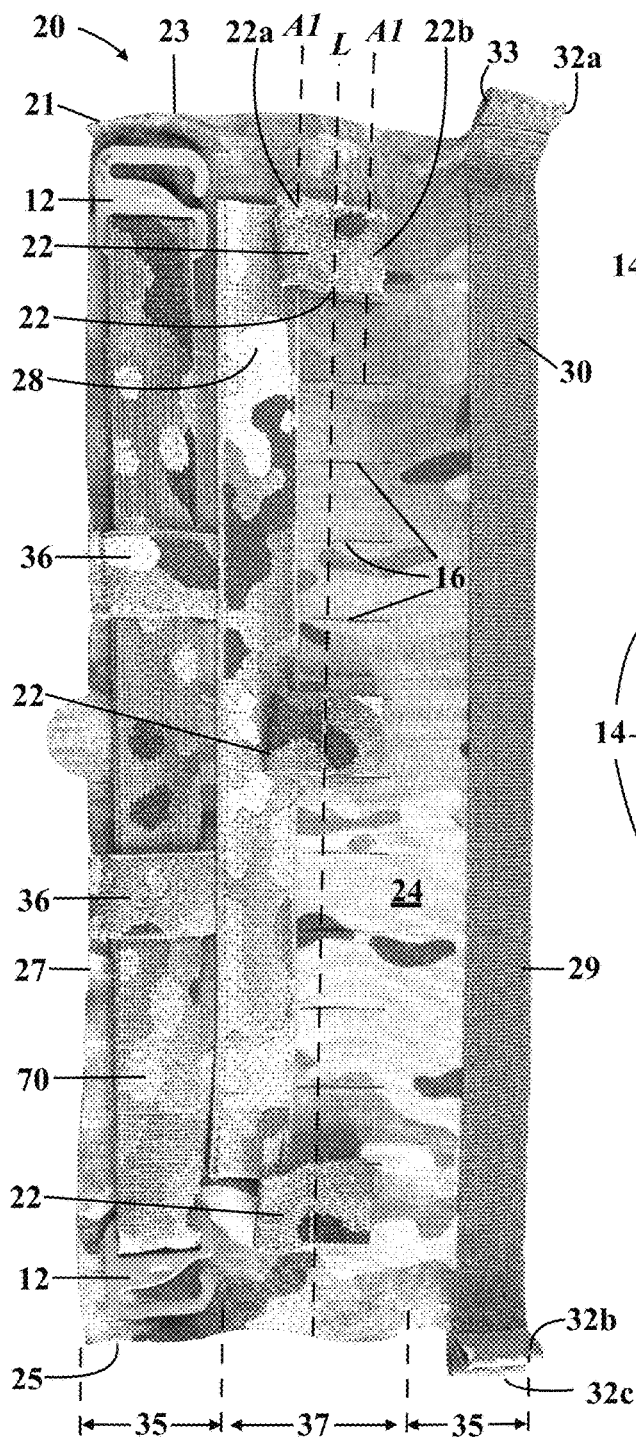
FIG. 10 is a plan view of the exterior (i.e., front) surface of a flattened leg sleeve of the assembly of FIG. 1.
Figure 11:
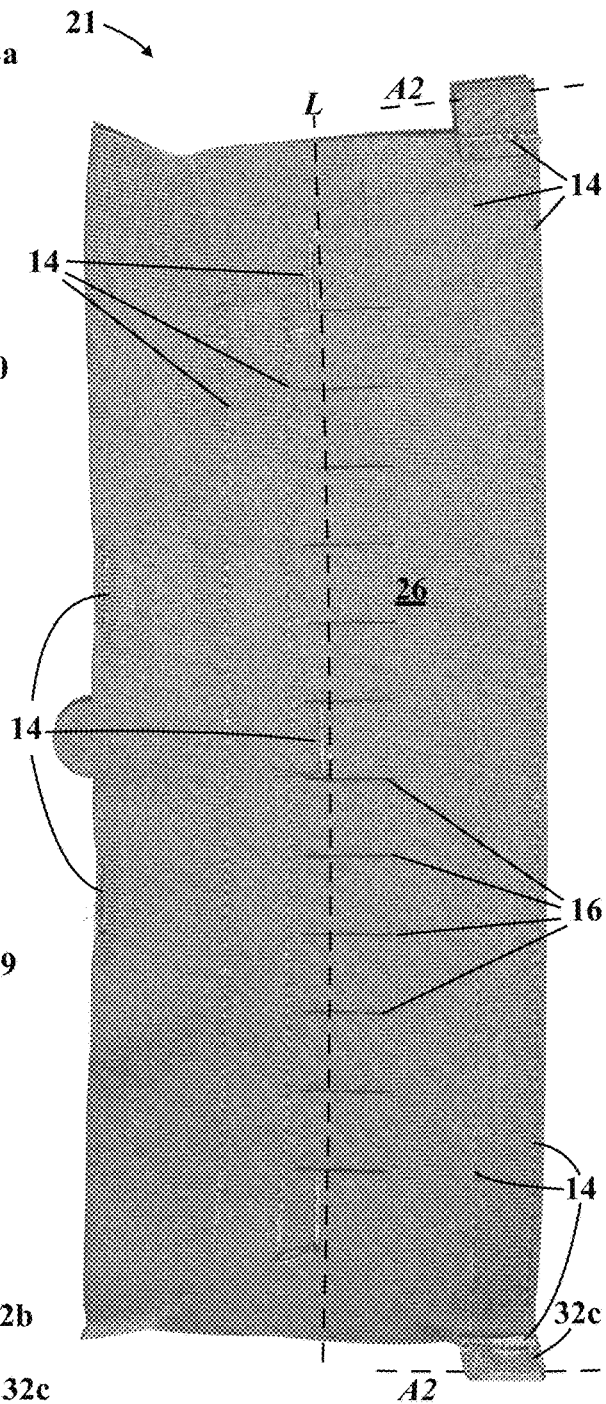
FIG. 11 is a plan view of the interior (i.e., back) surface of the flattened leg sleeve of FIG. 10.

Referring now to FIGS. 10-11, each leg sleeve 20 is formed from a rectangular sheet or panel 21 of one or more durable, flexible materials. Each panel 21 includes an upper end 23, a lower end 25, a length extending from the upper end 23 to the lower end 25, a left edge 27, a right edge 29, a width extending between the left and rights edges 27, 29, a front surface 24, and a back surface 26. The front surface 24 forms the exterior surface of the leg sleeve 20 when the leg sleeve 20 is wrapped around and securely mounted on a leg 92 of the tripod 90 as described herein. Each leg sleeve 20, when so mounted on a leg 92, has an inboard portion 35 facing the interior space 18 defined between the tripod legs 92 and an outboard portion 37 facing away from the interior space 18.

Each flexible panel 21, and thus each leg sleeve 20, is sized so as to be approximately the same length as the uppermost non-telescopic portion of the tripod legs 92 in order to maximize an area concealed by the wall panel(s). However, in other embodiments, the leg sleeves 20 can have a length greater or less than the length of the non-telescopic portion of the tripod legs 92. The width of each panel 21 is also sized so as to be greater than a circumference of each tripod leg 92 in order to permit a portion of one side of the panel 21 to overlap a portion of the other side of the panel 21 when the panel 21 is wrapped around and mounted on a tripod leg 92.

In order to secure a panel 21 on a leg 92, the back surface 26 of each panel 21 includes means for securing the back surface 26 to the front surface 24, such as a touch fastener. In the embodiment depicted in FIG. 11, the back surface 26 of the panel 21 is covered with the touch fastener. However, in other embodiments, the back surface 26 can instead include one or more strips or discrete regions of the touch fastener. The front surface 24 of each panel 21 includes a strip 30 of another touch fastener complimentary to that covering the back surface 26.

The strip 30 of touch fastener is secured to the front surface 24 of each panel 21 along the length of the right edge 29 by stitching 14. However, other suitable means known to ordinarily skilled artisans can be used to secure strip 30 to the panels 21, such as adhesive.

As shown in FIGS. 10-11, the touch fastener covering the back surface 26 of the panel 21 includes a plurality of loops for a hook-and-loop fastener, and the touch fastener forming the strip 30 includes a plurality of hooks for a hook-and-loop fastener. In other embodiments, the touch fasteners can be reversed, however, the use of the loop portion of a hook-and-loop fastener on the back surface 26 of the panel 21 enables a tighter and thus more reliable engagement between the leg sleeve 20 and the tripod leg 92.

Each panel 21 can be releasably engaged with a leg 92 of the tripod 90 by tightly wrapping the panel 21 around the leg 92 with the back surface 26 of the panel facing the leg 92 so that the loop fastener covering the back surface 26 of the left edge 27 overlaps and matingly engages the strip 30 of hook fastener on the right edge 29 of the front surface 24. To protect the mating engagement between the two portions of touch fastener when a panel 21 (i.e., leg sleeve 20) is wrapped around and securely mounted on a tripod leg 92, the panel 21 is oriented such that the strip 30 of hook fastener faces an interior space 18 defined between the legs 92 of the tripod 90. This helps prevent the leg sleeves 20 from becoming accidentally disengaged from the tripod legs 92.

In alternate embodiments, the leg sleeves 20 can instead be attached to the tripod legs 92 via an adhesive, friction, retention straps (e.g., rubber bands, bungie cord, zip ties, etc.) or the like. For example, in some embodiments, each leg sleeve 20 can be a tubular member formed from a synthetic polymeric material capable of shrinking to fit the tripod legs 92 (i.e., a shrink fit) upon the application of heat. In other embodiments, each leg sleeve 20 can be a tubular member formed from a stretchable or elastomeric material or fabric such as elastic.

Referring again to FIG. 10, each panel 21 further includes three primary anchor tabs 22 which serve as attachment points or anchors for a wall panel 40 as described in more detail below. The primary anchor tabs 22 depicted herein are secured to the front surface 24 of the panel 21 by stitching 14. However, in other embodiments, the primary anchor tabs 22 can be secured to each panel 21 by other means, such as a suitably strong adhesive. It should also be noted that each panel 21 can, in other embodiments, include a different number of anchor tabs 22. For example, a panel 21 could include only two anchor tabs, or more than three anchor tabs, as exemplified by the assembly 10*d* depicted in FIGS. 6-9. However, it is important that each panel 40, and thus each leg sleeve 20, include at least two primary anchor tabs 22 so as to provide each wall panel 40 of the assembly with two points of attachment on each adjacent leg sleeve 20. This design ensures that the wall panel(s) 40 of the assembly remain taught, stable, upright, and load-bearing while attached to a pair of adjacent leg sleeves 20 mounted on the legs of a multi-legged stand 90.

As depicted herein, the anchor tabs 22 can be secured to the front surface 24 of the panel 21 in a row spaced along an imaginary reference line L centered between the left 27 and right 29 edges and extending from the upper end 23 to the lower end 25. Each primary anchor tab 22 forms a pair of left and right anchor loops 32*a*, 32*b*. Each left and right anchor loop 22*a*, 22*b* defines an axis A1 extending substantially parallel to the length of the panel 21. As such, when the panel is wrapped around and releasably engaged with a tripod leg 92 as described above, the axis A1 of each left and right anchor loop 22*a*, 22*b* is oriented parallel to a longitudinal axis of the leg 92.

The primary anchor tabs 22 depicted herein are formed from a short strip of flexible webbing having two opposing ends. The ends of the webbing are folded over and secured to a central portion of the webbing located between the ends such that a first portion of the webbing extending from the central portion to first end forms the left anchor loop 22*a* and a second portion of the webbing extending from the central portion to the second end forms the right anchor loop 22*b*. As such, the primary anchor tabs 22 have a cross section generally resembling a flattened figure eight. Additionally, because the short strip of webbing used to form the primary anchor tabs 22 has a width of approximately one inch, the left and right anchor loops 22*a*, 22*b* each has a flexible but generally tubular shape defining an elongated eyelet 31 with a cross section that generally resembles a flattened tear drop. The shape and size of each left and right anchor loop 22*a*, 22*b* is designed to receive and tightly engage releasable fasteners 12 discussed in more detail below.

As shown in FIG. 10, each panel 21 also includes three additional, identical secondary anchor loops 32*a*, 32*b*, 32*c* which serve as attachment points or anchors for a floor panel 60 and accessory straps 70 as described in more detail below. The secondary anchor loops 32*a*, 32*b*, 32*c* depicted herein are secured to the upper 23 and lower 25 ends of the panel 21 by stitching 14. However, in other embodiments, the secondary anchor loops 32*a*, 32*b*, 32*c* can be secured to each panel 21 by other means, including adhesives.

Figure 16:
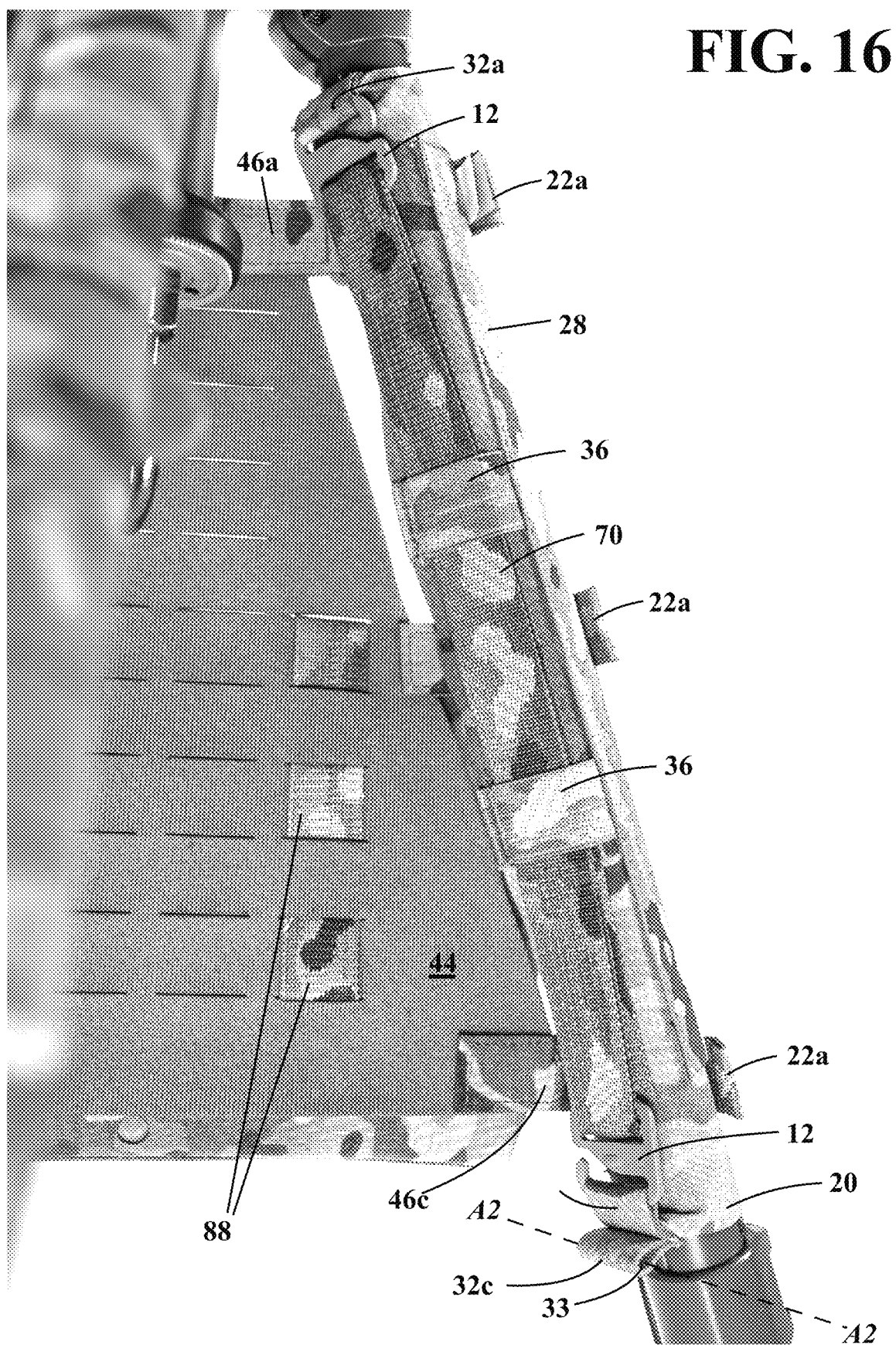
FIG. 16 is a rear perspective detail view of the assembly of FIG. 15 showing an inboard portion of the exterior surface of the rightmost leg sleeve with an accessory strap to which is connected two releasable fasteners received in the upper and lower secondary anchor loops secured to the upper and lower ends of the leg sleeve. Two strips of flexible material secured to the surface of the leg sleeve transverse to a length of the accessory strap define between the strip and the surface of the leg sleeve a narrow space in which the accessory strap is received and thereby retained against the exterior surface of the leg sleeve.
Figure 17:
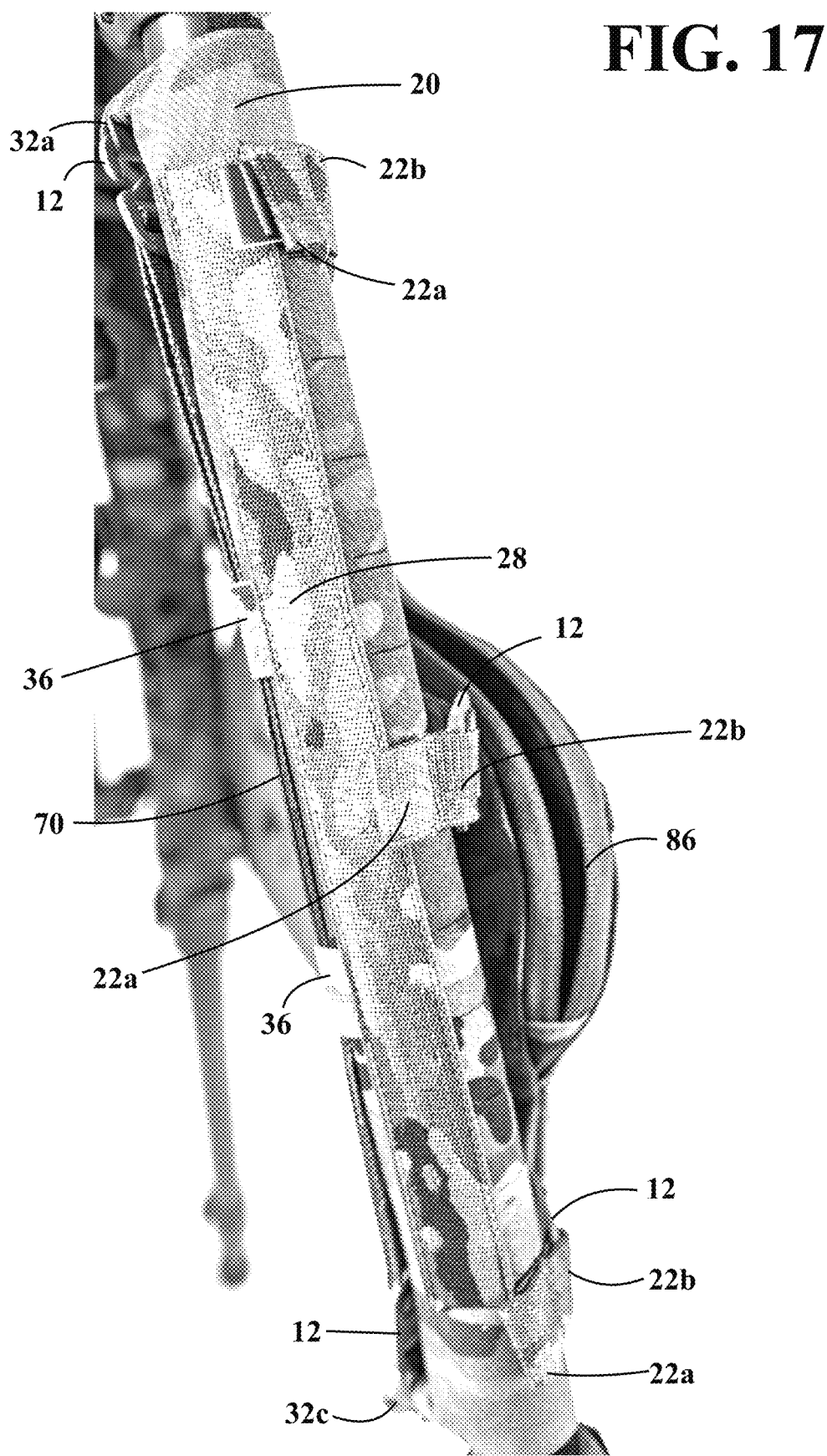
FIG. 17 is a perspective detail view of the assembly of FIG. 16 showing the assembly from a viewpoint rotated approximately 45 degrees to the right (i.e., clockwise) relative to the view of FIG. 16. An elongated strip of elastomeric material secured to the exterior surface of the leg sleeve defines between the strip and the exterior surface a narrow pocket in which an elongated object is removably receivable.
Figure 18:
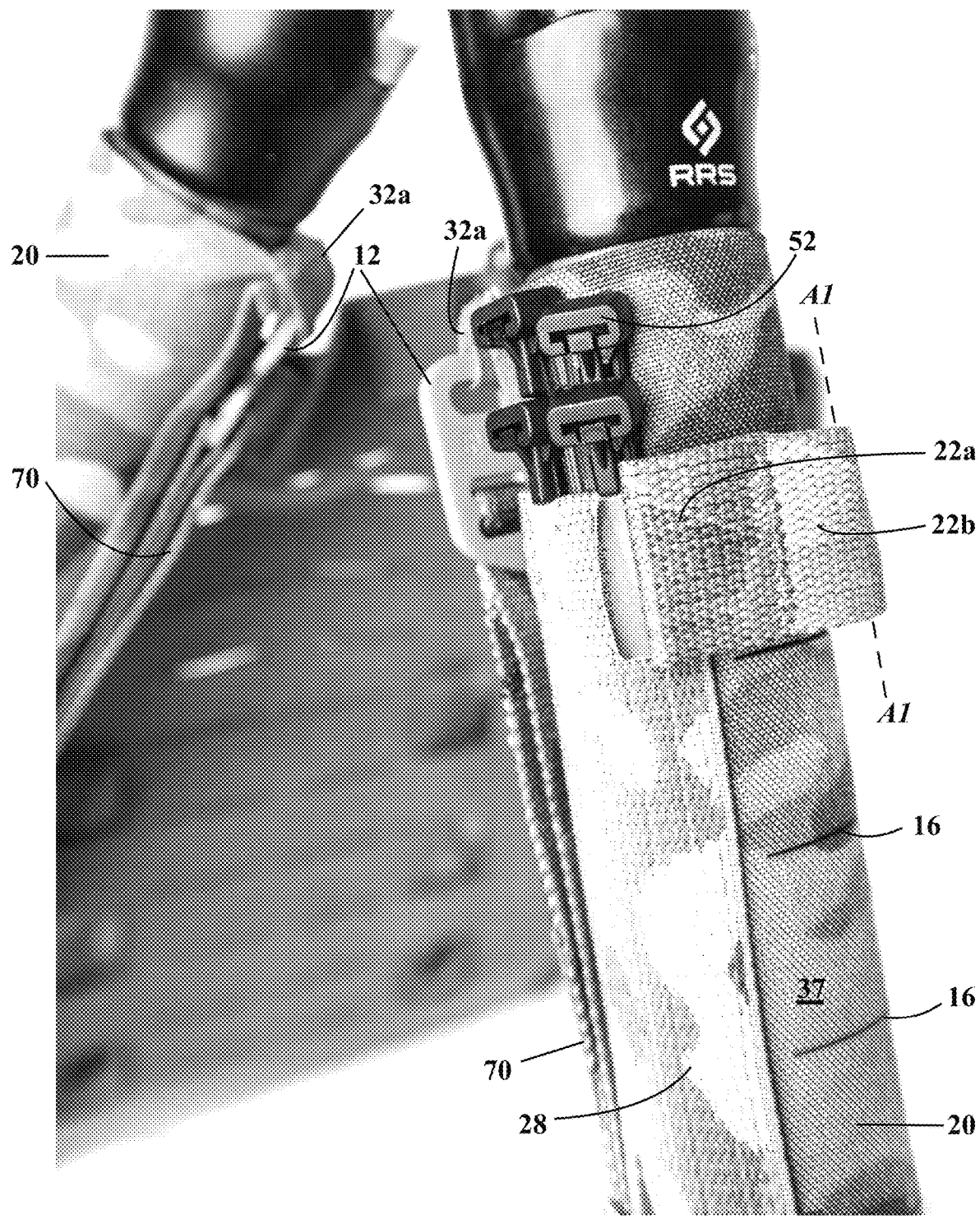
FIG. 18 is another perspective detail view of the assembly of FIG. 16 showing four zip ties received in the narrow pocket defined between the strip of elastomeric material and the exterior surface of the leg sleeve.
Figure 19:
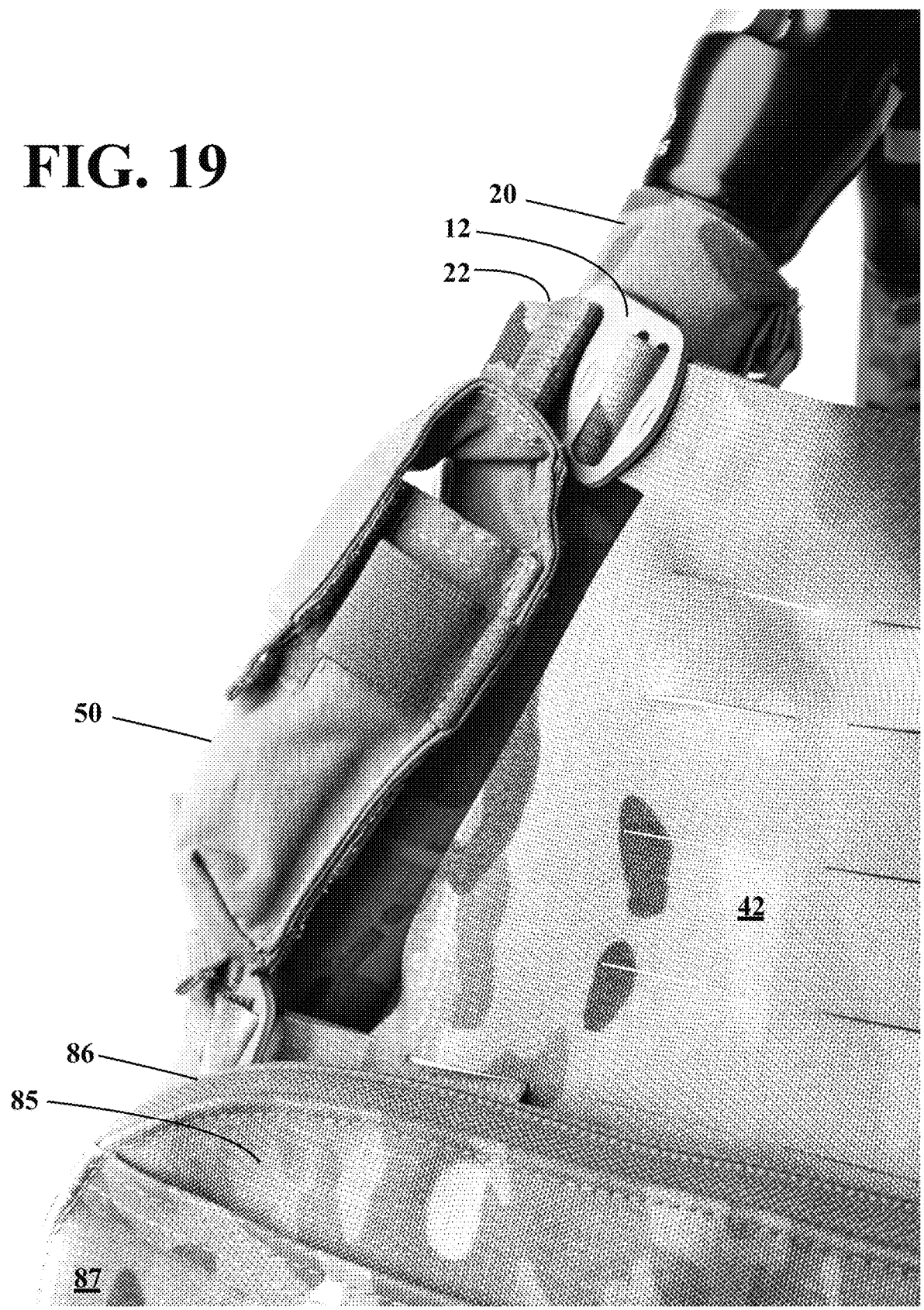
FIG. 19 is a perspective detail view of the assembly of FIG. 1 showing a small modular, light weight load-bearing equipment (MOLLE) pouch releasably secured to one of the leg sleeves via the column of horizontal slots defined in the leg sleeve.

Secondary anchor loop 32*a* is secured to the upper end 23 of the right edge 29 of the panel 21 adjacent to the upper end of the strip 30 of touch fastener, while secondary anchor loops 32*b*, 32*c* are secured to the lower end 25 of the right edge 29 of the panel 21 adjacent to the lower end of the strip 30 of touch fastener. As such, bottommost secondary anchor loop 32*c* serves as an attachment point or anchor for a floor panel 60, while the uppermost and middle (i.e., intermediate) loops 32*a* and 32*b*, respectively, serve as attachment points for an accessory strap 70. This placement of secondary anchor loops 32*a*, 32*b*, 32*c* relative to primary anchor tabs 22 ensures that the secondary anchor loops 32*a*, 32*b*, 32*c* are located on an inboard portion 35 of the leg sleeve 20 facing the interior space 18, while the primary anchor tabs 22 are located on an outboard portion 37 of the leg sleeve 20 facing away from the interior space 18 when a panel 21 (i.e., leg sleeve 20) is wrapped around and mounted on a tripod leg 92, as best shown in FIG. 16. In this way, interference the wall panel 40 and the floor panel 60 can each be independently attached or detached from its corresponding anchor tabs without interfering with the other panel.

Securement of secondary anchor loops 32a, 32b, and 32c to a side of each panel 21 (i.e., the right side in FIG. 10) which is overlapped by the other (i.e., left) side of the same panel 21 and located on an inboard portion of the leg sleeve 20 when the sleeve 20 is wrapped around and mounted on a tripod leg 92 advantageously ensures that placement of a load on any of these loops does not cause the sleeve 20 to peel away from itself (i.e., by causing the complimentary touch fasteners on the front and back surface of the panel to disengage) and thus prematurely release the tripod leg 92.

Figure 20:
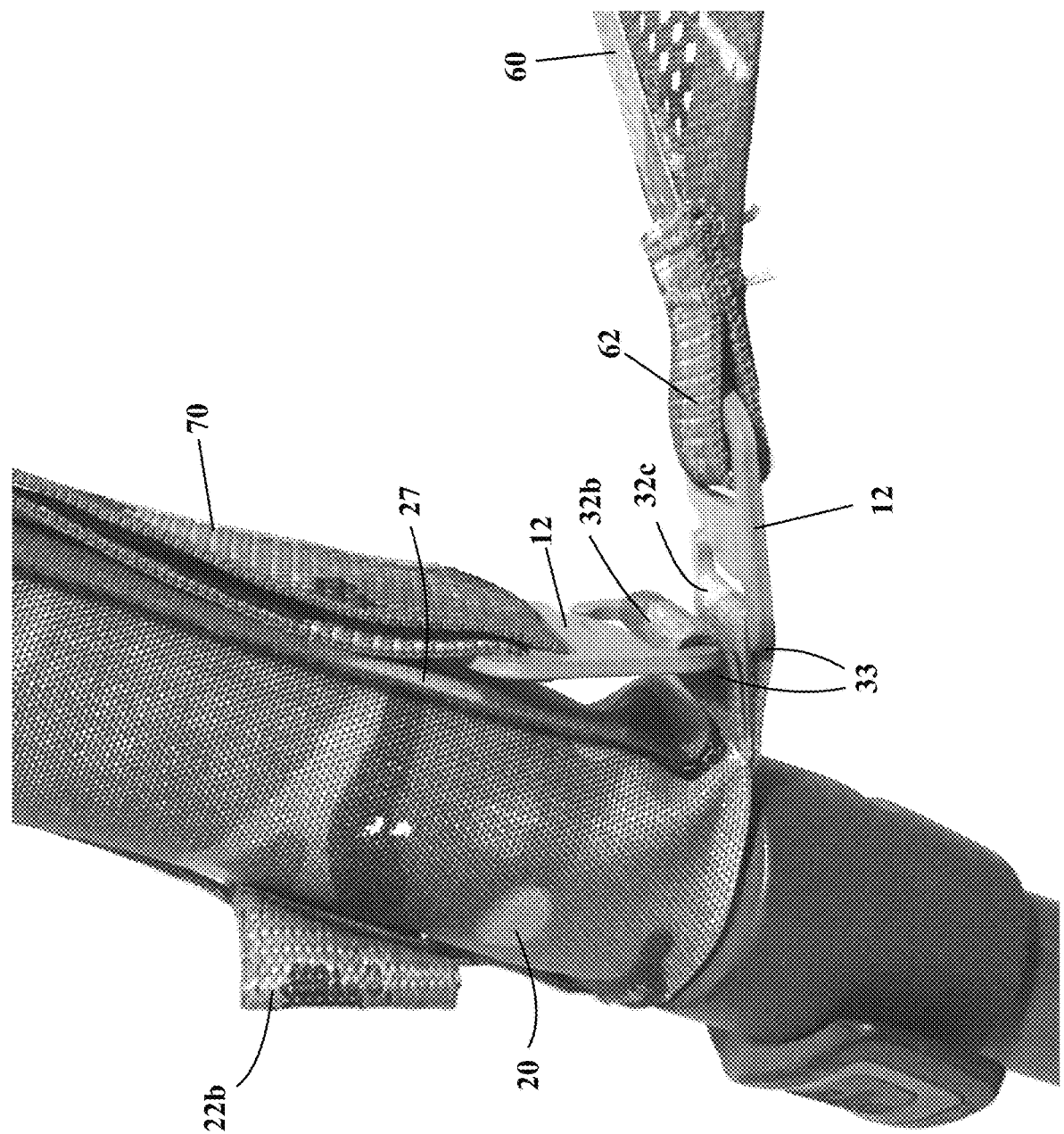
FIG. 20 is a perspective detail view of the assembly of FIG. 2 showing a releasable fastener received in a first secondary anchor loop secured to the lowermost end of the exterior surface of one leg sleeve, another releasable fastener received in a second secondary anchor loop secured to lower end of the leg sleeve above and adjacent to the first secondary anchor loop, and a primary anchor loop secured to a portion of the exterior surface of the leg sleeve outboard of the two secondary anchor loops.

Each secondary anchor loop 32a, 32b, 32c defines an axis A2 extending substantially parallel to the upper and lower ends 23, 25 of the panel 21 and transverse to the axis A1 defined by the primary left and right anchor loops 22a, 22b. As such, when the panel 21 (i.e., leg sleeve) is wrapped around and releasably engaged with a tripod leg 92 as described herein, the axis A2 of each secondary anchor loop 32a, 32b, 32c is oriented parallel to the ground (i.e., horizontally) as most easily understood by reference to FIG. 20.

Similar to primary anchor loops 22a, 22b, secondary anchor loops 32a, 32b, 32c are formed from a short, folded strip of webbing or other flexible material having two opposing ends secured together with the corresponding end of the panel 21. Like primary anchor loops 22a, 22b, the strip of material from which secondary anchor loops 32a, 32b, 32c are formed has a width of approximately one inch and have a flexible but generally tubular shape defining an elongated eyelet 33 with a cross section that generally resembles a flattened tear drop. The shape and size of secondary anchor loops 32a, 32b, 32c is designed to receive and tightly engage releasable fasteners 12 discussed in more detail below.

Referring again to FIG. 10, each leg sleeve panel 21 further includes two horizontal accessory strap retaining loops 36 for retaining a flexible accessory strap 70 (discussed below) against each leg sleeve 20. Each retaining loop 36 includes opposing widthwise ends which are secured the front surface 24 of the panel 21 proximate to the left edge 27 by stitching 14. In this way, there is defined between each retaining loop 36 and the exterior surface 24 of each leg sleeve 20 a narrow space in which flexible accessory strap 70 is removably, slidably receivable. As best shown in FIG. 16, the retaining loops 36 frictionally engage and thereby retain the accessory strap 70 against an inboard surface 35 of the leg sleeve 20. Retention of the accessory straps 70 on the outer overlapping inboard portion 35 of the leg sleeves 12 by retaining loops 36 ensures that when the accessory straps 70 are in their stowed position as shown in FIG. 16, both overlapping (i.e., left and right) sides of the panel 21 are held together by the accessory strap 70 itself, which helps maintain the leg sleeves 20 securely in place on the tripod 90.

Still referring to FIG. 10, each leg sleeve panel 21 can further include an elongated strip 28 of elastomeric material secured to the front surface 24. The elastomeric strip 28 include opposing lengthwise edges and opposing widthwise ends. The lengthwise edges are secured to the panel by stitching 14, while the widthwise ends are not. In this way there is defined between the elastomeric strip 28 and the exterior surface 24 of each leg sleeve 20 a narrow pocket in which one or more elongated and narrow (i.e., thin) objects, such as a zip tie 52 or writing implement, is removably, slidably receivable. Although the strip 28 can be formed from other flexible materials, formation of the strip 28 from an elastomeric material allows the strip to stretch and thereby frictionally retain the elongated object against the exterior surface of the leg sleeve 20. The elastomeric strip 28 is secured along a portion of the leg sleeve panel 21 adjacent the primary anchor tabs 22 so as to ensure that the strip 28 is located on an outboard surface 37 of the leg sleeve 20, and is thus readily accessible to a user, when the leg sleeve 20 is mounted on a tripod 90.

Referring again to FIGS. 10-11, each leg sleeve panel 21 can also include a column of precisely spaced, laser-cut, horizontal slots 16 extending from the front surface 24 to the back surface 26. This grid of slots 16 is designed to replicate a PALS grid or ladder. As such, the leg sleeves 20 provide another upright, load bearing surface on which a user can selectably position and mount an item of modular lightweight load-carrying equipment (MOLLE) or other gear. The column of slots 16 is formed along a portion of the leg sleeve panel 21 adjacent to the primary anchor tabs 22 and opposite the tabs 22 from the elastomeric strip 28 so as to ensure that the slots 16 are located on an outboard surface 37 of the leg sleeve 20, and are thus readily accessible to a user, when the leg sleeve 20 is mounted on a tripod 90 as previously described.

In some embodiments, such as the assembly 10d depicted in FIGS. 6-9, each panel 21 can further include a length of cordage 54 secured to the front surface 24 that extends the length of the leg sleeve 20 along imaginary reference line L over the outermost surface of the primary anchor tabs 22. The cordage 54, as well as the anchor tabs 22, provide convenient attachment points for hanging, fastening, tying, or otherwise securing objects, such as vegetation, to the assembly 10d.

Each panel 21 can be formed from any durable, flexible material, including natural and synthetic molded, weaved, draw-formed, waterproof, water resistant, and cut-resistant textiles. Suitably durable and flexible materials include but are not limited to nylon and CORDURA® fabric. In some embodiments, a suitably durable, flexible material includes a water repellant substance coating one or more surfaces of the material. Preferred materials can have a camouflage pattern printed thereon.

Figure 14:
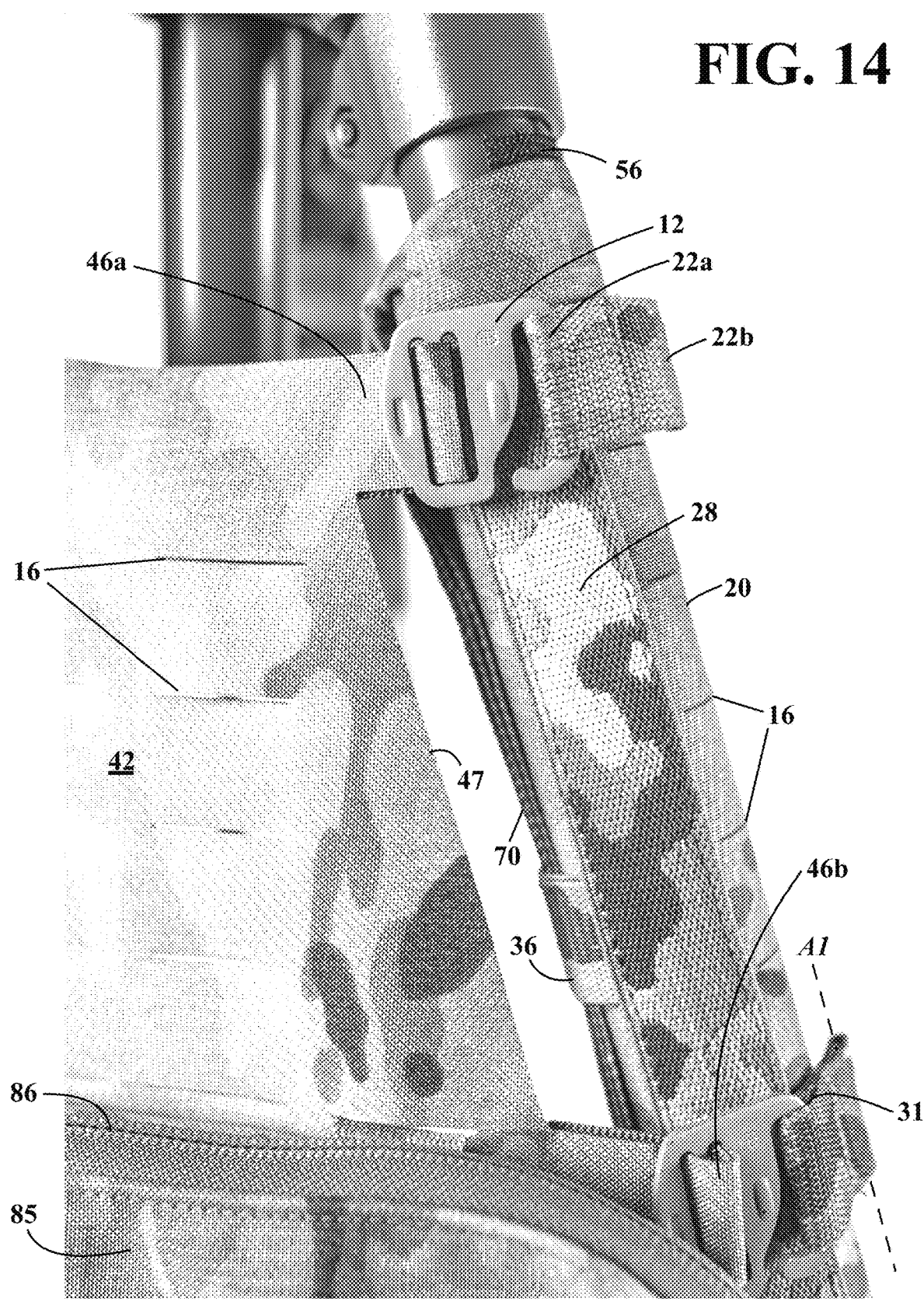
FIG. 14 is a perspective detail view of the assembly of FIG. 1 showing two releasable fasteners connected to the straps extending from the right side of the flexible wall panel received in the primary anchor tabs secured to one leg sleeve.
Figure 15:
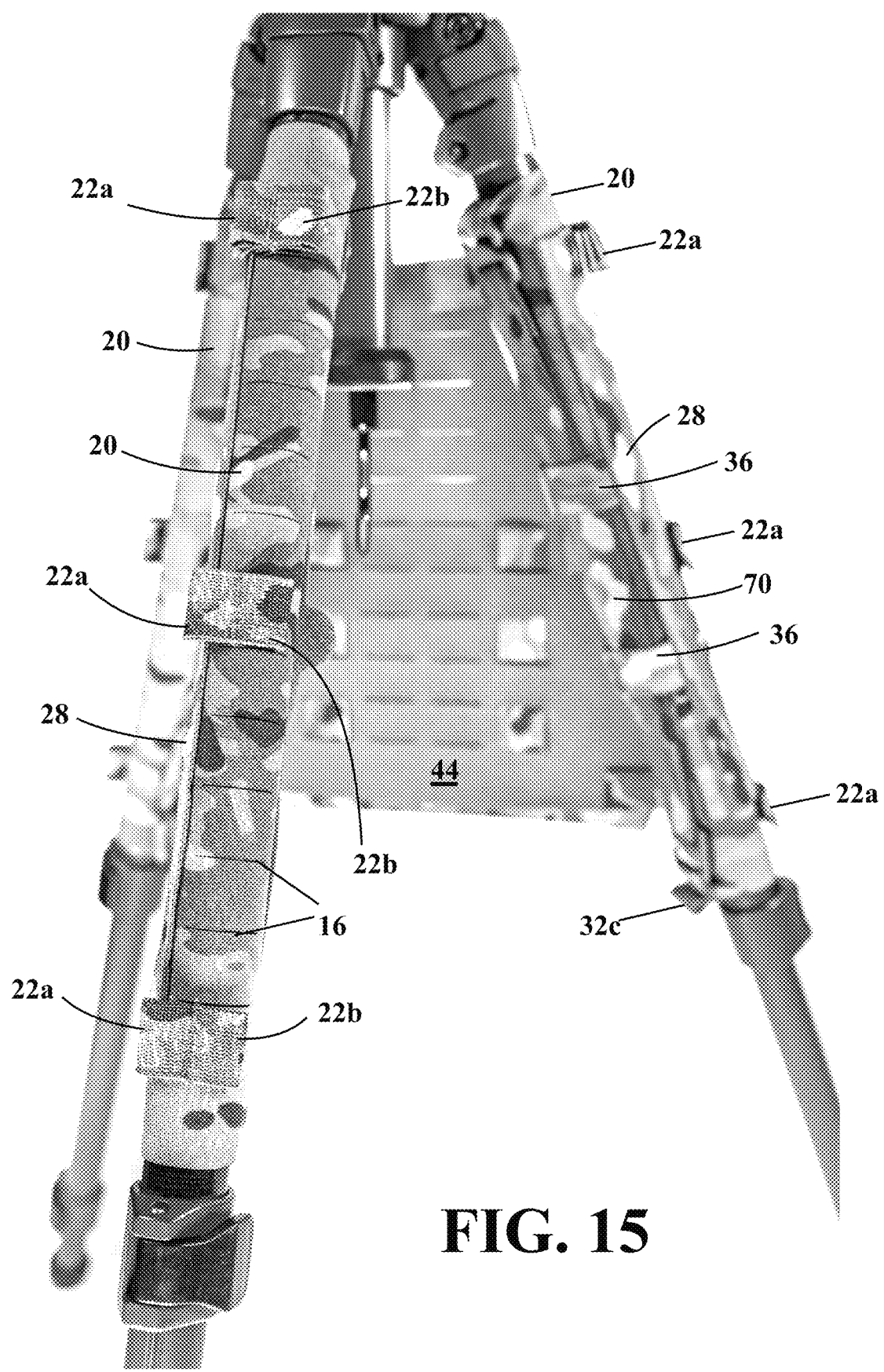
FIG. 15 is a rear perspective detail view of the assembly of FIG. 1 showing the outboard portion of the exterior surface of the foremost leg sleeve with three pairs of primary left and right anchor loops secured thereto. A column of vertically spaced, horizontal slots defined through the leg sleeve are visible between the primary anchor loops.

In some embodiments, as best shown in FIG. 14, each panel 21 or leg sleeve 20 can also include a separately formed strip of a flexible touch fastener material 56 designed to be adhered to an exterior surface of each leg 92 of a multi-legged stand in order to immobilize each leg sleeve 20 on the leg 92 when the touch fastener on the back of each leg sleeve is matingly engaged with each strip 56. As such, each strip of touch fastener 56 includes a first surface, and a second surface opposite the first surface. The first surface includes a touch fastener complimentary to that include on the back surface of each panel 21 or leg sleeve 20. The second surface includes an adhesive strong enough to secure the strip 56 to the exterior surface of a stand leg 92.

Wall Panels

Figure 12:
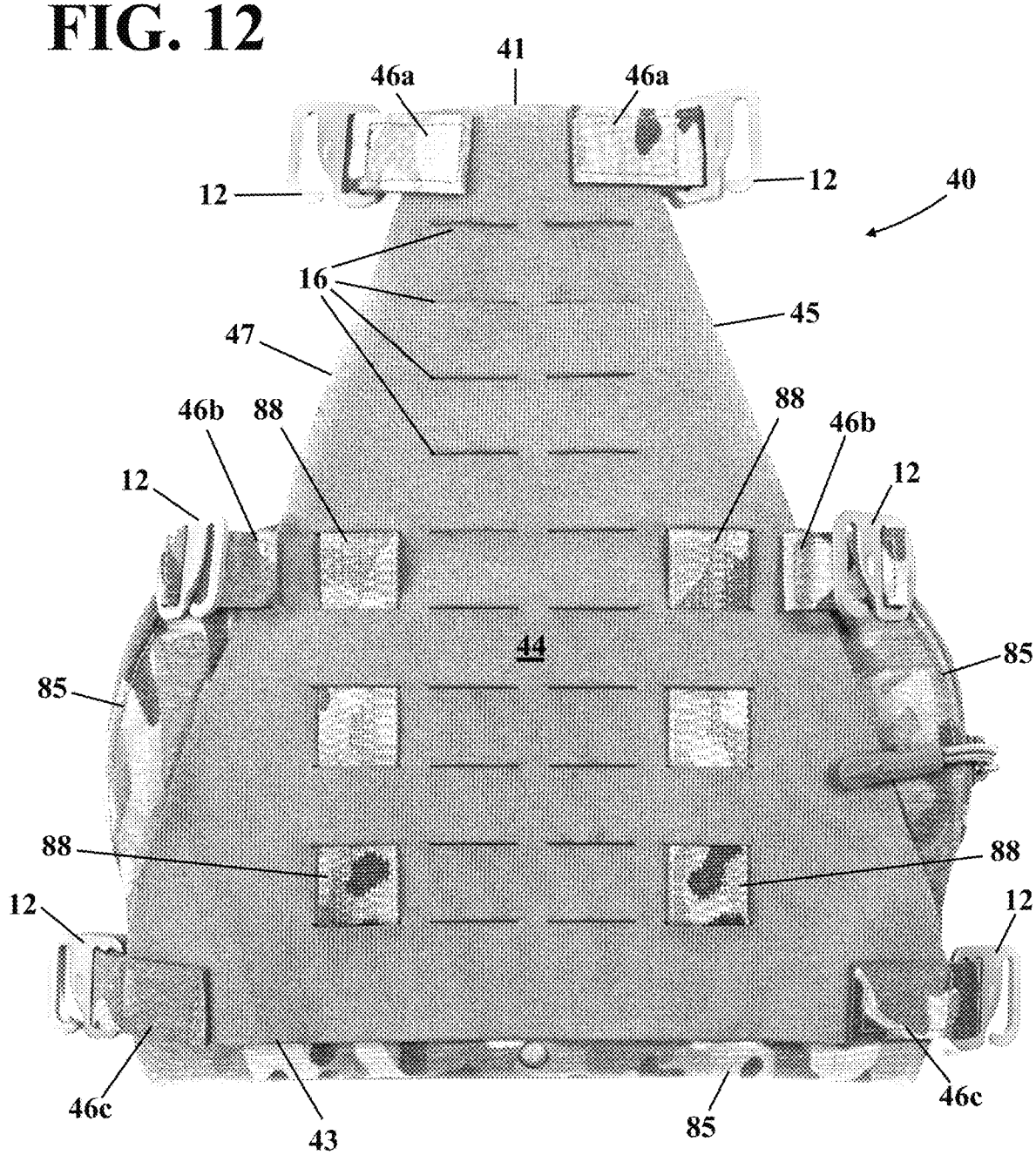
FIG. 12 is an elevational view of the back surface of the wall panel depicted in FIG. 1 showing three straps extending from each of the left and right sides of the wall panel, a releasable fastener connected to each strap, and the flexible MOLLE pouch releasably secured to the front surface of the wall panel by two strips of webbing woven through a plurality of horizontal slots defined through the wall panel.
Figure 13:
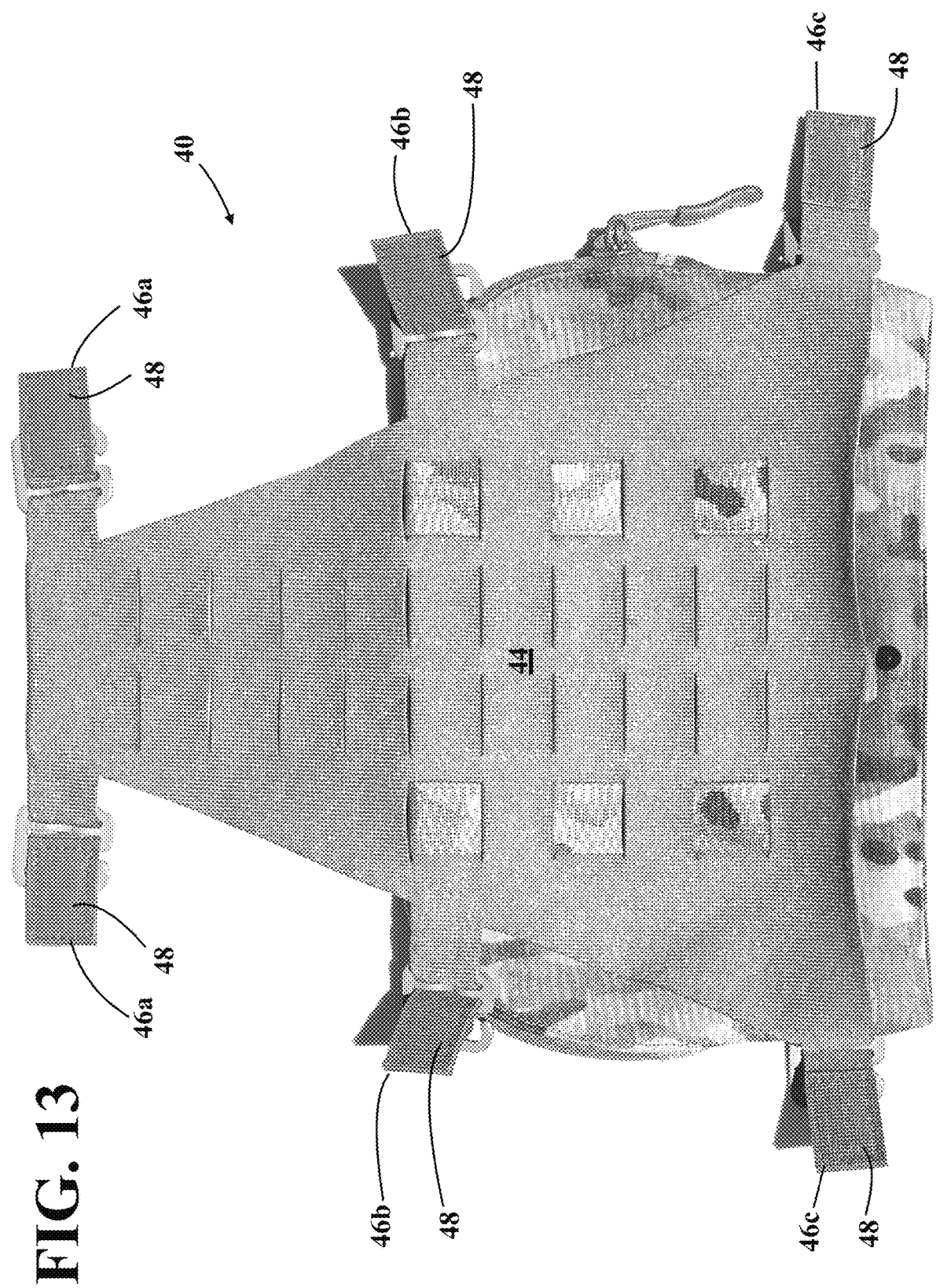
FIG. 13 is another elevational view of the back surface of the wall panel of FIG. 12 showing the straps extending from each of the left and right sides of the wall panel in an open position to illustrate the strips of touch fastener secured to the end of each strap.

Referring now to FIGS. 12-13, each wall panel 40 is formed from a sheet or panel of one or more of the same durable, flexible materials from which the leg sleeves 20 disclosed herein can be formed. However, it can be desirable to form each wall panel 40 from a water proof or water-resistant material, or to coat one or more surfaces of each wall panel with a water proof or water-resistant material, in order to better protect objects stored inside the interior space 18 from weather or other liquids encountered in the field.

Each wall panel 40 is configured to extend between and releasably engage two adjacent leg sleeves 20 when the leg sleeves are releasably engaged to two corresponding legs 92 of the tripod. Each wall panel 40 is shaped and sized to fill a planar space or gap defined between a pair of adjacent tripod legs 92 so as to shelter items stored in the interior space 18 from inclement weather and physical percussion. As such, the wall panels depicted herein have a generally triangular shape which includes a base, two equal sides extending from the base at an acute angle, and a top edge having a width less than that of the base. The top extends between the sides at an obtuse angle and parallel to the base, as shown in FIG. 12. However, in alternate embodiments, the wall panels 40 can have a different shape configured to mirror a shape defined between two adjacent legs of a multi-legged stand other than a tripod, or to allow a portion of an outsized item stored within the interior space 18 to extend out of the interior space 18 without piercing the wall panel 40.

Each wall panel 40 includes an upper end 41, a lower end 43, a length extending from the upper end 41 to the lower end 43, a left side 45, a right side 47, a width extending between the left and rights sides 45, 47, a front surface 42, and a back surface 44. Three flexible tensioning straps 46a, 46b, 46c extend from each of the left and right sides 45, 47. A manually releasable fastener in the form of an adjustable slide G-hook buckle 12 having a one-inch wide hook mouth is connected to each tensioning strap 46a, 46b, 46c.

A plurality of vertically spaced rows of uniformly spaced horizontal laser-cut slots 16 extend through the panel from the front surface to the back surface. Each slot 16 is sized to receive and interface with a one-inch wide strip of webbing so as to enable a user to secure one or more items of MOLLE or MOLLE/PALS-compatible items and accessories, such as pouches 50, 85, to one or both of the front 42 (i.e., outboard) and back 44 (i.e., inboard) surfaces of the panel 40. This provides a user maximum flexibility in where the user mounts shooting equipment or other gear on the assemblies disclosed herein. For example, a user may prefer to locate sensitive gear such as navigation equipment in the interior space 18 defined between the leg 92 of the tripod 90 by mounting the corresponding item of MOLLE on the back surface 44 of a wall panel 40. Conversely, a user may prefer to locate less sensitive or frequently needed gear such as writing implements or "DOPE" cards (i.e., a sheet of reference material with ballistic data from previous engagements) outboard of the interior space 18 by mounting the corresponding item of MOLLE on the front surface 42 of a wall panel 40. The grid or ladder of slots 16 also provides strong attachment points for hanging, resting, tying, and/or storing other items using various releasable fasteners, such as hooks, clips, carabiners, and zip ties.

As shown in FIGS. 12-13, each tensioning strap 46a, 46b, 46c includes a strip of touch fastener 48 secured to the back surface 44 of the end of each strap. The remainder of the back surface 44 of the wall panel 40 is covered in another touch fastener complimentary to that on the strap ends. The end of each tensioning strap 46a, 46b, 46c is threaded through a pair of slots defined in each G-hook buckle 12 and folded back toward the center of the wall panel 40 to matingly engage the touch fastener covering the back surface 44 of the panel 40 and thereby secure the G-hook 12 on the strap. Similar to the leg sleeves 20 described above, the back surface 44 of each wall panel 40 is covered with the touch fastener. As shown in FIGS. 12-13, the touch fastener covering the back surface of each wall panel 40 includes a plurality of loops for a hook-and-loop fastener, and the strip of touch fastener 48 secured to the back surface 44 of the end of each tensioning strap 46a, 46b, 46c includes a plurality of hooks for a hook-and-loop fastener. In other embodiments, the touch fasteners can be reversed, however, the use of the loop portion of a hook-and-loop fastener on the back surface 44 of the wall panel 40 facilitates attachment of corresponding hook-backed (i.e., hook for a hook and loop fastener) items of MOLLE or other gear safely inside the interior space 18.

The hook portion of each G-hook buckle 12 connected to the straps 46a, 46b, 46c extending from the left side 45 of each wall panel 40 are removably receivable in the corresponding right anchor loops 22b of the left leg sleeve 20 of an adjacent pair of leg sleeves, while the hook portion of each G-hook buckle 12 connected to the straps 46a, 46b, 46c extending from the right side 47 of each wall panel 40 are removably receivable in the corresponding left anchor loops 22a of the right leg sleeve 20 of the adjacent pair to releasable secure each wall panel 40 to a pair of adjacent leg sleeves as best shown in FIGS. 1, 4, and 14. Each wall panel 40 can be selectably tensioned or loosened by tightening or loosening the straps 46a, 46b, 46c within the G-hook buckles 2 against the primary anchor loops 22 on the leg sleeves 20. Specifically, the wall panel 40 can be tensioned (i.e., drawn taught) by disengaging the ends of each relevant tensioning strap 46a, 46b, 46c from the back surface 44 of the wall panel 40 and pulling more of each strap through the slots in the corresponding G-hook 12 before reengaging the ends of the strap with the touch fastener on the back surface 44.

Conversely, each wall panel 40 can be individually detached, completely or partially, from one or both corresponding leg sleeves 20 by withdrawing the hook portion of the corresponding G-hook buckle(s) 30 from the left or right anchor loop(s) 22a, 22b of the corresponding leg sleeve(s) 20. It should be understood, however, that although the wall panels 40 are shown attached to the leg sleeves 20 via straps 46a, 46b, 46c and G-hooks 12, wall panels 40 can instead be releasably yet securely attached to leg sleeves 20 by other means, including clasps, buckles, cordage, hook and loop fasteners, or other fasteners known in the art. It should also be understood that wall panels 40 can comprise fewer or a greater number of straps 46a, 46b, 46c and G-hook buckles 12 spaced along the side edges of the walls panels at different intervals than shown in the figures.

Floor Panel

Referring now to FIGS. 2-3, 8, and 20 the floor panel 60 provides a load-bearing surface in the form of a shelf or hammock upon which objects can be stowed in the interior spaces 18 of assemblies disclosed herein. The floor panel is formed from a triangular sheet or panel 60 of durable yet flexible mesh material that allows liquid which may interior the interior space 18 to drain through the floor panel 60 and wet objects stored on the floor panel 60 to dry. It should be noted that while the floor panel 60 is depicted in the figures as triangular, it can, in some embodiments, have the same, greater, or fewer sides than number of legs of a multi-legged stand to which it is intended to be attached. In additional embodiments, the floor panel can be formed from a non-mesh material.

Referring now to FIG. 3, the floor panel 60 includes three sides and three vertices. A flexible strap 62 is secured to each vertex. A manually releasable fastener in the form of an adjustable slide G-hook buckle 12 having a one-inch wide hook mouth is connected to each tensioning strap 62. Each strap 62 can be a non-adjustable strap or an adjustable tensioning strap alike in structure and function to wall panel tensioning straps 46a, 46b, 46c.

Similar to how the wall panels 40 are configured to releasably engage the left and right anchor loops 22a 22b of each leg sleeve 20, the floor panel 16 is configured to releasably engage to the lowermost secondary anchor loop 32c (discussed above) of each leg sleeve 20. More specifically, the hook portion of each G-hook buckle 12 connected to the floor panel 60 is releasably receivable in lowermost secondary anchor loop 32c extending from the lower end 25 of each leg sleeve 20. It should be understood, however, that although the floor panel 60 is shown attached to the lowermost secondary anchor loop 32c of leg sleeves 20 via G-hooks 12, floor panel 60 can instead be releasably yet securely attached to leg sleeves 20 by other means, including clasps, buckles, cordage, hook and loop fasteners, or other fasteners known in the art. Alternatively, the floor panel 60 can be releasably attached to the primary anchor loops 22a, 22b, to vary the height of floor panel 60. However, it should be noted that the orientation of the eyelets 31 and thus the axes A1 defined by the primary left and right anchor loops 22a, 22b is perpendicular to the eyelets 33 and thus the axes A2 defined by the secondary anchor loops 32c. The relative orientation of the primary and secondary anchor loops help maintain the load bearing surfaces of the wall panels 40 and floor panel 60 in their respective intended planes.

In some embodiments, the floor panel 60 can include a central through hole (not shown) shaped and sized to accommodate the central column 94 of a tripod 90 or other multi-legged stand. This would allow the user to raise the floor panel 16 as high as desired within the interior space without limiting the function of the tripod. It would also expand the versatility of the inventive assemblies disclosed herein by allowing the assemblies to function with tripods and other multi-legged stands that include an abnormally long central column which may reach close to ground level during normal use.

Accessory Straps

Figure 21:
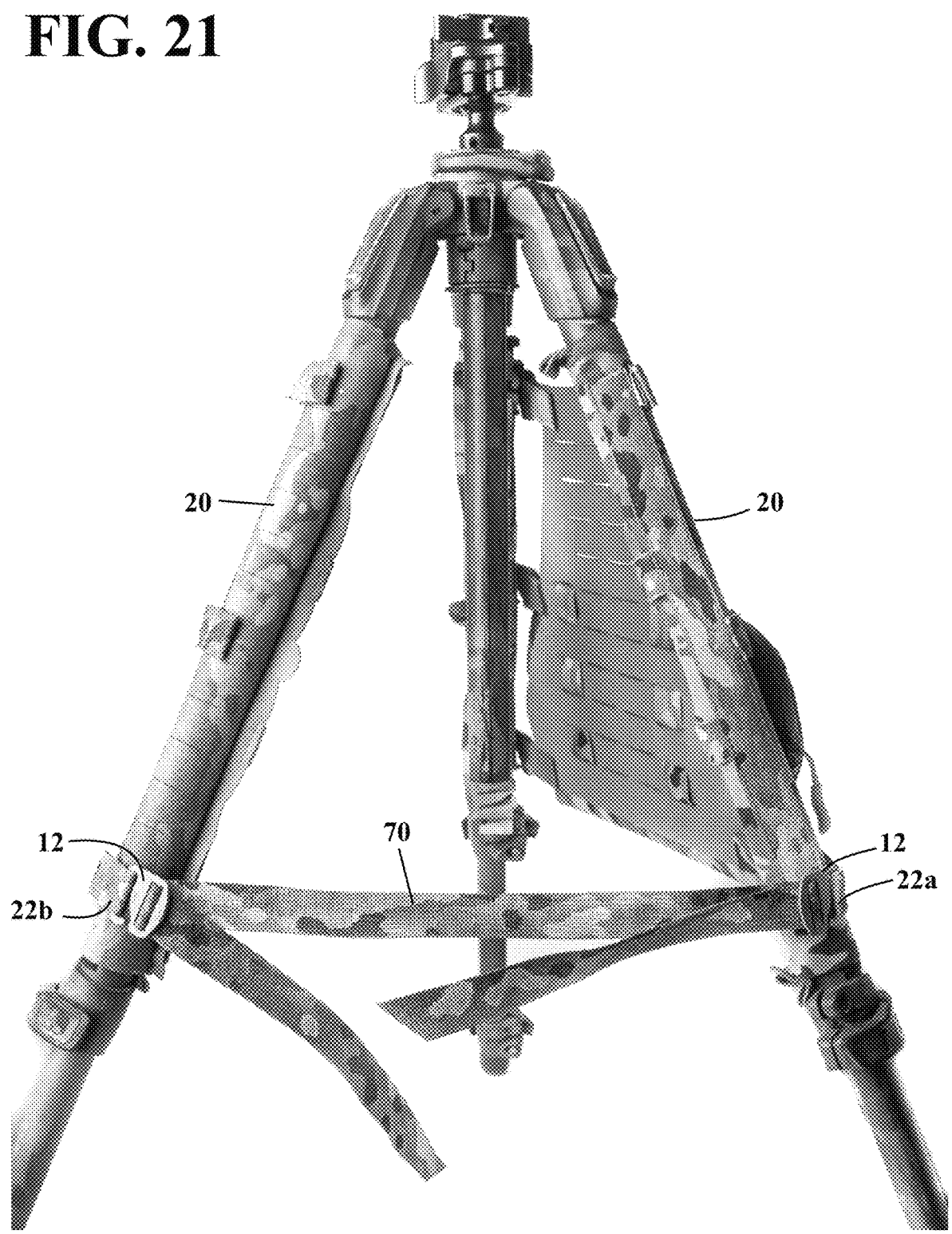
FIG. 21 is a perspective detail view of the assembly of FIG. 1 with a third leg sleeve showing an accessory strap in a deployed position wherein a first releasable fastener connected to a first end of the strap is received in the lowermost primary anchor loop of the left leg sleeve and a second releasable fastener connected to the other end of the strap is received in the lowermost primary anchor loop of the right leg sleeve so as to stretch the strap taught to create a support for a firearm.
Figure 24:
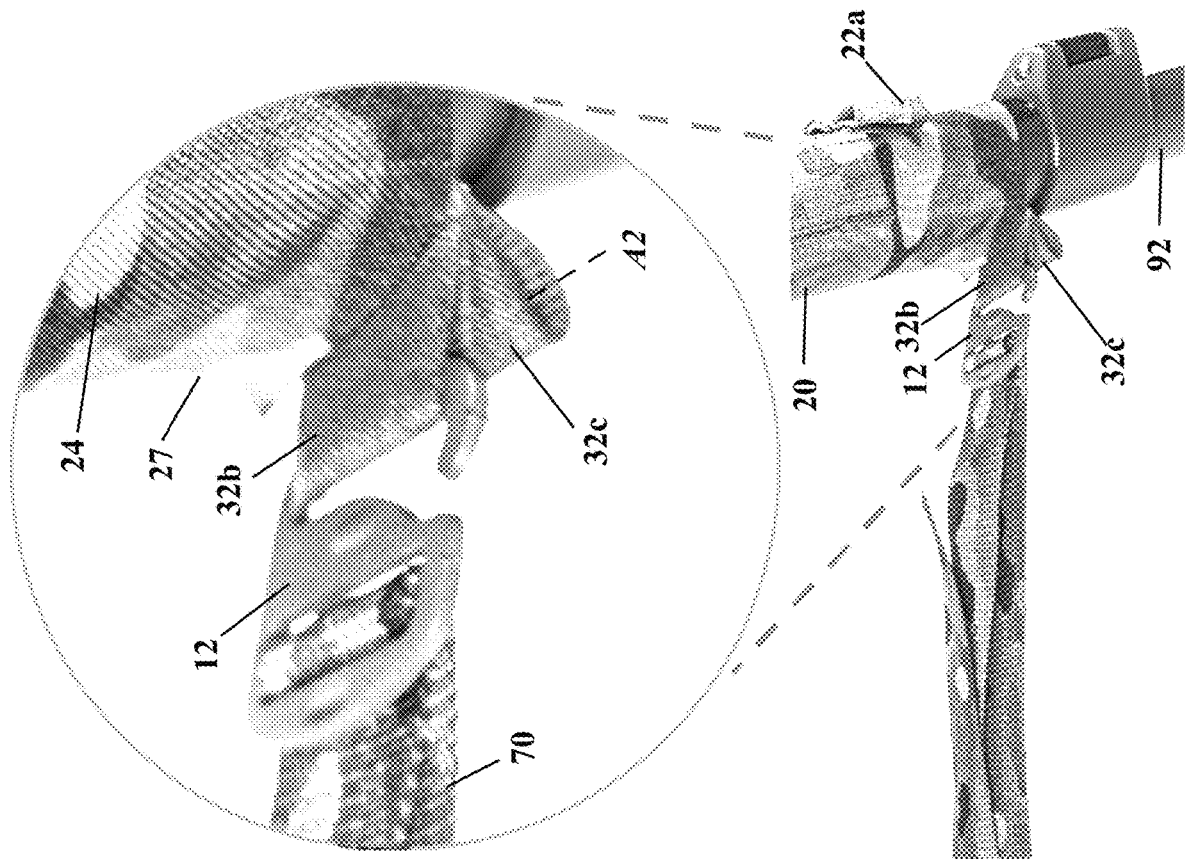
FIG. 24 is a magnified view the indicated portion of FIG. 23 showing how a releasable fastener connected to the accessory strap is received in a secondary anchor loop of the right leg sleeve.
Figure 23:
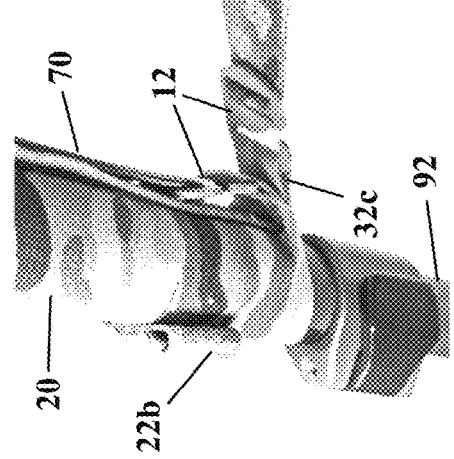
FIG. 23 is another perspective detail view of the assembly of FIG. 1 showing an accessory strap in a deployed position wherein one releasable fastener is received in the lowermost secondary anchor loop of the left leg sleeve and the other releasable fastener is received in the lowermost secondary anchor loop of the right leg sleeve.

Referring now to FIGS. 16 and 21-23, each leg sleeve 20 includes an elongated, flexible accessory strap 70 configured to be quickly and easily releasably secured to any two corresponding anchor loops (i.e., primary or secondary anchor loops) located at the same relative elevation level on adjacent leg sleeves 20, as shown in FIGS. 21-23, to provide a load-bearing sling for supporting the weight of a firearm or other object (e.g., spotting scope).

This is particularly advantageous in situations where it is necessary or desirable for a team or pair of users to operate in close proximity. For example, under certain circumstances, it may be necessary for a sniper and spotter team to "stack up" and operate together using one tripod. In such cases, a first user can use the tripod to support and stabilize his or her equipment (e.g., firearm or spotting scope) in the traditional way, while the second user can quickly and easily deploy an accessory strap 70 between two corresponding primary or secondary anchor loops on a pair of adjacent leg sleeves to provide a load-bearing sling for supporting the weight of the second user's equipment (e.g., firearm, spotting scope, and the like) at a lower elevational level below the first user. Alternatively, a second accessory strap 70 can be deployed between another pair of adjacent leg sleeves at the same or a different elevational level as the first accessory strap to provide a second sling and thus a second point of contact and increased stability for the second user's equipment.

Accessory straps 70 included in the assemblies disclosed herein can alternatively be put to various additional uses, such as retention or attachment of items on or to an assembly or in the interior space 18 defined between legs of a multi-legged stand. Accessory straps 70 can also be used effectively as a tourniquet or for tying vegetation and/or other materials to an assembly or multi-legged stand in order to further conceal the stand or create a sniper hide.

Each accessory strap 70 has a length greater than a diameter of the interior space 18 and greater than the length of the panels 21 from which each leg sleeve 20 is formed. However, in some embodiments, the length of each accessory strap 70 is at least twice that of the panels 21 from which each leg sleeve 20 is formed. A manually releasable fastener in the form of adjustable slide G-hook buckle 12 having a one-inch wide hook mouth is connected to each of an upper end 72 and a lower end 74 of each accessory strap 70. The G-hook buckle 12 connected to the upper end 72 of each accessory strap 70 is removably receivable in secondary anchor loop 32a, and the G-hook buckle 12 connected to the lower end 74 of the accessory strap 70 is removably receivable in secondary anchor loop 32b while the strap 70 is received in the narrow space between each retaining loops 36 and the exterior surface 24 of each leg sleeve 20 to releasably secure the accessory strap 70 to an inboard portion 35 of the exterior surface 24 of each leg sleeve 20, as best shown in FIG. 16. Securement of the accessory strap 70 to an inboard surface 35 of each leg sleeve 20 maintains the strap 70 out of a user's way when the strap 70 is not in use.

When use of an accessory strap 70 is necessary or desirable, a user may disengage the G-hook 12 connected to the upper and lower ends 72, 74 of the strap from secondary anchor loops 32a and 32b, respectively, and slide the strap 70 out of the narrow spaces defined by retaining loops 36 against the corresponding leg sleeve 20. The G-hook buckle 12 connected to the upper end 72 of an accessory strap 70 can then be removably received in any one of the left anchor loops 22a of one leg sleeve 20, and the G-hook buckle 12 connected to the lower end 74 of the accessory strap 70 can be removably received in the corresponding right anchor loop 22b of an adjacent leg sleeve 20 at the same relative elevational level, as best exemplified in FIGS. 21-22. Alternatively, the G-hook buckles 12 can similarly be removably received in any two corresponding secondary anchor loops 32a, 32b, 32c of two adjacent leg sleeves 20, as exemplified in FIG. 23. An accessory strap 70 can be placed in a slack condition or stretched tight between adjacent leg sleeves 20 to suit the user's preference or a given application.

Each accessory strap 70 can be formed from a durable, flexible material such as webbing, ribbon, cordage, or any other suitably durable yet flexible material or materials. It is also to be understood that various other releasable fasteners, including, for example, hooks, clasps, buckles, cordage, hook and loop fasteners, and the like, can alternatively be used in place of G-hook buckles 12 on the accessory straps 70 disclosed herein.

Windowed Pouch

Referring now to FIGS. 1-2, 5, and 17, there are depicted different embodiments of the novel assemblies disclosed herein including a flexible, windowed MOLLE pouch 85 releasably secured to a wall panel 40. The pouch 85 defines an interior compartment sized and shaped to receive and contain the constituent components of any assembly disclosed herein when the assembly is not in use. Additionally, when an assembly disclosed herein is assembled and mounted on a tripod or other multi-legged stand 90 as described above, the pouch 85 serves as a convenient holder in which one or more pieces of frequently used equipment or gear, such as a KESTREL® weather station, a small U.S. military squad-sized radio, military map pens, writing implements, a SUREFIRE® flashlight, and handgun ammunition magazines, can be stored near to hand in between uses.

The pouch 85 includes a zipper closure 86 operable to selectably close an opening in the pouch and seal the interior compartment, and two strips of webbing 88 secured to a rear surface of the pouch 85. The two strips of webbing 88 are interwoven through and thereby interface with the horizontal slots 16 defined through the wall panel 40 to releasably secure the pouch 85 to the wall panel 40 horizontally or vertically (not shown).

The pouch 85 further advantageously includes a panel of transparent polymeric material 87 secured to a front surface of the pouch so as to define against the front surface a clear pocket 87 in which a sheet of reference material 15 (e.g., ballistic data such as a DOPE card, aperture data, photographs, mission parameters or notes, and the like) is removably receivable and visible to a user when received in the pocket 87. The clear pocket 87 is formed so as to tightly press a sheet of reference material 15 against the exterior or front surface of the pouch 85 and thereby protect the reference material 15 from weather and moisture.

The pouch 85 can be formed from one or more sheets of panels of one or more of the same durable, flexible materials from which the leg sleeves 20 and wall panels 40 disclosed herein can be formed. However, the moisture protection afforded to reference material 15 received in the pocket 87 can be further enhanced by the use of waterproof and/or water-resistant fabrics or coatings to form or coat the pouch 85.

Although embodiments of the present invention have been described in detail, it will be understood by those skilled in the art that various modifications can be made therein without departing from the spirit and scope of the invention as set forth in the appended claims. For example, although the invention has been described in the context of military operations to support, conceal, and hold firearms and related shooting equipment, it is to be understood that the invention disclosed herein can also be used to support, conceal, and hold other objects for use in other applications. Further, it is to be understood that the invention is not limited to use with tripods. It is specifically contemplated that the invention may also be used with multi-legged stands having fewer or a greater number of legs than a tripod.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful MODULAR FIREARM SHOOTING SUPPORT, CONCEALMENT MD, AND ACCESSORY HOLDER ASSEMBLY FOR A MULTI-LEGGED STAND, it is not intended that such references be construed as limitations upon the scope of this invention except as set forth in the following claims.

What is claimed is:

1. An assembly for mounting and concealing items on a tripod, comprising:
    a first flexible leg sleeve configured to wrap around and releasably engage a first leg of the tripod;
    a second flexible leg sleeve configured to wrap around and releasably engage a second leg of the tripod;
    a plurality of primary anchor tabs secured to an exterior surface of each of the first and second flexible leg sleeves;
    a first flexible wall panel having a plurality of rows of uniformly spaced horizontal slots defined therethrough;
    a plurality of straps extending from each of a left side and a right side of the first flexible wall panel; and
    a plurality of releasable wall panel fasteners connected to the plurality of straps, the wall panel fasteners removably receivable in the primary anchor tabs to secure the first flexible wall panel to the first and second flexible leg sleeves;
    wherein the first flexible wall panel screens a portion of an interior space defined in part between the first and second legs of the tripod from a viewpoint outboard of the first flexible wall panel, and provides an upright load bearing surface to which a user can selectably mount an item of modular light-weight load-carrying equipment when the first and second flexible leg sleeves are engaged with the first and second legs of the tripod, the wall panel fasteners are received in the primary anchor tabs of the first and second flexible leg sleeves, and the tripod is in a deployed position.

2. The assembly of claim 1, wherein the primary anchor tabs are spaced along a length of the exterior surface of each of the first and second flexible leg sleeves located outboard of the interior space when the first and second flexible leg sleeves are engaged with the first and second legs of the tripod.

3. The assembly of claim 1, wherein:
    each said primary anchor tab is a pair of left and right anchor loops.

4. The assembly of claim 3, wherein:
each said left and right anchor loop defines an axis extending substantially parallel to an axis of the first or second leg of the tripod when the first or second flexible leg sleeve to which the left and right anchor loops are secured is engaged with the respective first or second leg.

5. The assembly of claim 4, wherein each said primary anchor loop is formed from a strip of flexible webbing having opposing first and second ends folded over and secured to a central portion of the strip of flexible webbing located between the first and second ends such that a first portion of the strip of flexible webbing extending from the central portion to a first location proximal to the first end forms the left anchor loop and a second portion of the strip of flexible webbing extending from the central portion to a second location proximal to the second end forms the right anchor loop.

6. The assembly of claim 3, further comprising:
a third flexible leg sleeve configured to wrap around and releasably engage a third leg of the tripod, the third flexible leg sleeve including a plurality of pairs of left and right anchor loops secured to an exterior surface thereof;
a second flexible wall panel having a plurality of rows of uniformly spaced horizontal slots defined therethrough;
a plurality of straps extending from each of a left side and a right side of the second flexible wall panel; and
a plurality of releasable wall panel fasteners connected to the plurality of straps extending from the second flexible wall panel; wherein:
the wall panel fasteners connected to the plurality of straps extending from the left side of the first flexible wall panel are removably receivable in the right anchor loops of the first flexible leg sleeve to selectably secure the left side of the first flexible wall panel to the first flexible leg sleeve;
the wall panel fasteners connected to the plurality of straps extending from the right side of the first flexible wall panel are removably receivable in the left anchor loops of the second flexible leg sleeve to selectably secure the right side of the first flexible wall panel to the second flexible leg sleeve;
the wall panel fasteners connected to the plurality of straps extending from the left side of the second flexible wall panel are removably receivable in the right anchor loops of the second flexible leg sleeve to selectably secure the left side of the second flexible wall panel to the second flexible leg sleeve; and
the wall panel fasteners connected to the plurality of straps extending from the right side of the second flexible wall panel are removably receivable in the left anchor loops the third flexible leg sleeve to selectably secure the right side of the second flexible wall panel to the third flexible leg sleeve.

7. The assembly of claim 3, further comprising:
a third flexible leg sleeve configured to wrap around and releasably engage a third leg of the tripod, the third flexible leg sleeve including a plurality of pairs of left and right anchor loops secured to an exterior surface thereof;
second and third flexible wall panels, each having a plurality of rows of uniformly spaced horizontal slots defined therethrough;
a plurality of straps extending from each of a left side and a right side of each of the second and third flexible wall panels; and
a plurality of releasable wall panel fasteners connected to the plurality of straps extending from each of the second and third flexible wall panels; wherein:
the wall panel fasteners connected to the plurality of straps extending from the left side of the first flexible wall panel are removably receivable in the right anchor loops of the first flexible leg sleeve to selectably secure the left side of the first flexible wall panel to the first flexible leg sleeve;
the wall panel fasteners connected to the plurality of straps extending from the right side of the first flexible wall panel are removably receivable in the left anchor loops of the second flexible leg sleeve to selectably secure the right side of the first flexible wall panel to the second flexible leg sleeve;
the wall panel fasteners connected to the plurality of straps extending from the left side of the second flexible wall panel are removably receivable in the right anchor loops of the second flexible leg sleeve to selectably secure the left side of the second flexible wall panel to the second flexible leg sleeve;
the wall panel fasteners connected to the plurality of straps extending from the right side of the second flexible wall panel are removably receivable in the left anchor loops of the third flexible leg sleeve to selectably secure the right side of the second flexible wall panel to the third flexible leg sleeve;
the wall panel fasteners connected to the plurality of straps extending from the left side of the third flexible wall panel are removably receivable in the right anchor loops of the third flexible leg sleeve to selectably secure the left side of the third flexible wall panel to the third flexible leg sleeve; and
the wall panel fasteners connected to the plurality of straps extending from the right side of the third flexible wall panel are removably receivable in the left anchor loops of the first flexible leg sleeve to selectably secure the right side of the third flexible wall panel to the first flexible leg sleeve and thereby enclose the interior space.

8. The assembly of claim 2, further comprising:
a third flexible leg sleeve configured to wrap around and releasably engage a third leg of the tripod, the third flexible leg sleeve including a plurality of primary anchor tabs secured to an exterior surface thereof;
a flexible floor panel having three vertices;
three floor panel straps, each said strap secured to a respective vertex of the floor panel;
three bottom secondary anchor loops, each said bottom secondary anchor loop secured to a bottom end of one of the first, second, and third flexible leg sleeves; and
three floor panel fasteners, each said floor panel fastener connected to a respective floor panel strap and removably receivable in the bottom secondary anchor loop of one of the first, second, and third flexible leg sleeves to secure the floor panel to each of the first, second, and third flexible leg sleeves;
wherein the floor panel provides a horizontal load bearing surface inside the interior space on which a user can selectably store and conceal an object when the first, second, and third flexible leg sleeves are respectively engaged with the first, second, and third legs of the tripod, the three floor panel fasteners are respectively received in the three bottom secondary anchor loops, the wall panel fasteners are received in the primary anchor tabs of any two of the first, second, and third flexible leg sleeves, and the tripod is in a deployed position.

9. The assembly of claim 8, wherein:
each said bottom secondary anchor loop defines an axis extending parallel to a ground when the respective first, second, or third flexible leg sleeve to which the bottom secondary anchor loop is secured is engaged with the respective first, second, or third leg of the tripod; and
each said bottom secondary anchor loop is secured to an inboard portion of the bottom end of the respective first, second, or third flexible leg sleeve facing the interior space when the respective first, second, or third flexible leg sleeve is engaged with the respective first, second, or third leg of the tripod.

10. The assembly of claim 9, further comprising:
at least one flexible accessory strap having a length greater than a length of each of the first, second, and third flexible leg sleeves;
three upper secondary anchor loops, each said upper secondary anchor loop secured to an inboard portion of an upper end of one of the first, second, and third flexible leg sleeves that faces the interior space when the first, second, and third leg sleeves are engaged with the respective first, second, and third legs of the tripod;
three intermediate secondary anchor loops, each intermediate secondary anchor loop secured to an inboard portion of a lower end of one of the first, second, and third flexible leg sleeves that faces the interior space when the first, second, and third leg sleeves are engaged with the respective first, second, and third legs of the tripod, the inboard portion of the lower end of each said leg sleeve being located adjacent to and above the bottom secondary anchor loop of each said leg sleeve;
three strips of flexible material, each said strip of flexible material having a first widthwise end and a second widthwise end, each said strip of flexible material secured to an inboard exterior surface of one of the first, second, and third flexible leg sleeves so as to define between each said strip of flexible material and the inboard exterior surface of each of the first, second, and third flexible leg sleeves a narrow space in which the accessory strap is slidably receivable;
a pair of first and second accessory strap fasteners connected to opposite end portions of the accessory strap, the first accessory strap fastener removably receivable in the upper secondary anchor loop and the second fastener removably receivable in the intermediate secondary anchor loop of any one of the first, second, or third flexible leg sleeves when the accessory strap is received in the narrow space to secure the accessory strap to the inboard exterior surface of said one of the first, second, or third flexible leg sleeves facing the interior space;
wherein the accessory strap is selectably movable between a stowed position located in the interior space wherein the first and second accessory strap fasteners are received in the upper and intermediate secondary anchor loops and the accessory strap is retained against the inboard exterior surface of said one of the first, second, or third flexible leg sleeves by at least one of said strips of flexible material, and a deployed position wherein the first and second accessory strap fasteners are removably received in a primary anchor tab of any two of the first, second, and third flexible leg sleeves to provide a load bearing sling for supporting a weight of a firearm.

11. The assembly of claim 10, wherein:
the primary anchor tabs and secondary anchor loops are formed from the strips of flexible material having a width of about one inch; and
the wall panel fasteners, floor panel fasteners, and accessory strap fasteners are G-hook adjustable slide buckles having a hook mouth width of about one inch.

12. The assembly of claim 1, wherein each said leg sleeve comprises:
a rectangular panel of flexible material having an upper end, a lower end, a length extending from the upper end to the lower end, a left edge, a right edge, a front surface which forms the exterior surface of at least one of the first and second leg sleeves when the leg sleeve is engaged with one of the legs of the tripod, and a back surface including a first touch fastener; and
a strip of a second touch fastener complimentary to the first touch fastener secured to the front surface of the first flexible panel along the length of the right edge, wherein the second touch fastener engages the first touch fastener to releasably secure the leg sleeve to the one leg of the tripod when the panel is wrapped around the one leg of the tripod with the back surface of the first flexible panel facing the one leg of the tripod so that the left edge of the back surface overlaps the right edge of the front surface;
wherein the primary anchor tabs are secured to the front surface of the panel and spaced along an imaginary reference line centered between the left and right edges and extending from the upper end to the lower end of the panel.

13. The assembly of claim 1, wherein:
the first and second flexible leg sleeves each include a strip of elastomeric material secured to the exterior surface thereof so as to define between the strip of elastomeric material and the exterior surface a narrow pocket in which an elongated object is removably receivable; and
the strip of elastomeric material stretches to releasably retain the elongated object against the exterior surface of the first or second flexible leg sleeve when the object is received in the narrow pocket and the first or second flexible leg sleeve is engaged with the respective first or second leg of the tripod.

14. The assembly of claim 1, further comprising a flexible pouch defining an interior compartment, the pouch including:
a zipper closure operable to selectably close an opening in the pouch and seal the interior compartment,
two strips of webbing secured to a rear surface of the pouch, and
a panel of transparent polymeric material secured to a front surface of the pouch so as to define against the front surface a clear pocket in which a sheet of reference material is removably receivable and visible to a user when received in the pocket;
wherein the two strips of webbing interface with the horizontal slots defined through the first flexible wall panel to releasably secure the pouch to the first flexible wall panel.

15. The assembly of claim 12, further comprising:
two strips of a flexible touch fastener material, each said strip having a first surface including a second touch fastener matingly engageable with the first touch fastener, and a second surface including an adhesive operable to secure the strip to the respective first or second leg of the tripod;

wherein each of the first and second flexible leg sleeves is selectably immobilized on the respective first and second leg of the tripod when each said strip of flexible touch fastener material is secured to the respective first and second leg of the tripod and the first touch fastener on the back surface of each of the first and second flexible leg sleeves matingly engages the second touch fastener.

16. The assembly of claim 1, wherein the first flexible wall panel defines a shape including:

a base having a width, two equal sides, said two equal sides extending from the base at an acute angle, and a top parallel to the base, the top extending between the sides at an obtuse angle and having a width less than the width of the base.

17. An assembly for mounting and concealing items on a multi-legged stand, comprising:

a plurality of leg sleeves, each said leg sleeve configured to be wrapped around and thereby releasably engaged with a respective leg of the multi-legged stand;

a flexible wall panel configured to extend between and releasably engage two leg sleeves of the plurality of leg sleeves to selectably secure the wall panel to the two leg sleeves; and a plurality of rows of uniformly spaced horizontal slots defined through the wall panel;

wherein the wall panel provides an upright, load bearing surface to which a user can selectably mount an item of modular light weight load-carrying equipment when the wall panel is engaged with the two leg sleeves, the plurality of leg sleeves are engaged with the respective legs of the multi-legged stand, and the multi-legged stand is in a deployed position.

18. The assembly of claim 17, further comprising:

a plurality of primary anchor tabs secured to an exterior surface of each said leg sleeve;

a plurality of straps extending from each of a left side and a right side of the wall panel; and a releasable wall panel fastener connected to each said strap, the wall panel fasteners removably receivable in the primary anchor tabs of the two leg sleeves to secure the wall panel to the two leg sleeves.

19. The assembly of claim 18, wherein each said leg sleeve comprises:

a rectangular panel of flexible material having an upper end, a lower end, a length extending from the upper end to the lower end, a left edge, a right edge, a front surface which forms an exterior surface of the leg sleeve when the leg sleeve is engaged with one of the legs of the multi-legged stand, and a back surface including a first touch fastener;

a strip of a second touch fastener complimentary to the first touch fastener secured to the front surface of the panel along the length of the right edge, wherein the second touch fastener matingly engages the first touch fastener to releasably secure the leg sleeve to one of the legs of the multi-legged stand when the panel is wrapped around the leg with the back surface of the panel facing the leg; and a plurality of substantially tubular, paired left and right anchor loops secured to the front surface of the panel and spaced along an imaginary reference line centered between the left and right edges and extending from the upper end to the lower end;

wherein the wall panel fasteners connected to the straps extending from the left side of the wall panel are removably receivable in the right anchor loops of a first leg sleeve of the plurality of leg sleeves and the wall panel fasteners connected to the straps extending from the right side of the wall panel are removably receivable in the left anchor loops of a second leg sleeve of the plurality of leg sleeves to secure the wall panel to the two leg sleeves.

20. The assembly of claim 18, further comprising:

a flexible floor panel;

a plurality of floor panel straps extending from the floor panel;

a plurality of secondary anchor loops, each said secondary anchor loop secured to a respective leg sleeve of the plurality of leg sleeves on an opposite side of the respective leg sleeve from the primary anchor tabs when the respective leg sleeve is engaged with a respective leg of the multi-legged stand; and a releasable floor panel fastener connected to each said floor panel strap, each said floor panel fastener removably receivable in the secondary anchor loop of a different leg sleeve to secure the floor panel to the leg sleeves;

wherein the floor panel provides a load bearing surface on which a user can selectably store and conceal an object when the leg sleeves are engaged with the respective legs of the multi-legged stand, the floor panel fasteners are received in the secondary anchor loops, the wall panel fasteners are received in the primary anchor tabs, and the multi-legged stand is in a deployed position.

21. The assembly of claim 19, wherein:

each said leg sleeve further comprises:

an uppermost secondary anchor loop secured to the upper end of the rectangular panel adjacent an upper end of the strip of the second touch fastener;

a lowermost secondary anchor loop secured to the lower end of the rectangular panel adjacent a lower end of the strip of the second touch fastener; and an intermediate secondary anchor loop secured to the rectangular panel above and adjacent to the lowermost secondary anchor loop;

wherein the uppermost, lowermost, and intermediate secondary anchor loops each define an axis extending transverse to the length of the rectangular panel; and the assembly further comprises:

a flexible floor panel having a plurality of floor panel straps extending from the floor panel, the floor panel straps equal in number to the number of leg sleeves in the plurality of leg sleeves;

a releasable floor panel fastener connected to each said floor panel strap, each said floor panel fastener removably receivable in the lowermost secondary anchor loop of each respective leg sleeve to selectably secure the floor panel to the leg sleeves;

a plurality of flexible accessory straps having a length greater than the length of the rectangular panel; and a pair of accessory strap fasteners connected to each said accessory strap, each said pair of accessory strap fasteners removably receivable in the uppermost and intermediate secondary anchor loops of each respective leg sleeve to secure each accessory strap to the respective leg sleeve.

22. An assembly for mounting and concealing items on a multi-legged stand, comprising:
- a pair of flexible leg sleeves, each said leg sleeve configured to wrap around and releasably engage a respective leg of the multi-legged stand;
- a plurality of anchor loops secured to an exterior surface of each said leg sleeve;
- a flexible wall panel having a left side, a right side, and a plurality of straps extending from each of the left and right sides; and
- a plurality of G-hook buckles, each said G-hook buckle connected to a respective strap of the plurality of straps and removably receivable in a respective anchor loop of the plurality of anchor loops to secure the wall panel to the pair of leg sleeves;
- wherein the wall panel is sized and shaped to substantially fill a space defined between the pair of leg sleeves when each said leg sleeve is engaged with the respective leg and the multi-legged stand is in a deployed position such that the wall panel is configured to screen an object located on a first side of the wall panel from a viewpoint located on a second side of the wall panel.

23. A multi-legged stand for supporting a firearm and mounting and concealing shooting equipment, the multi-legged stand comprising:
- a portable tripod having three telescopic legs that define an interior space when deployed;
- three flexible leg sleeves, each said leg sleeve configured to wrap around and releasably engage a respective leg of the portable tripod;
- a plurality of pairs of left and right anchor loops secured to an outboard portion of an exterior surface of each said flexible leg sleeve facing away from the interior space when each said flexible leg sleeve is engaged with the respective leg of the portable tripod, wherein each said anchor loop defines an axis extending substantially parallel to an axis of the respective leg when the flexible leg sleeve to which the pair of left and right anchor loops is secured is engaged with the respective leg of the portable tripod;
- a flexible wall panel having a plurality of rows of uniformly spaced horizontal slots defined therethrough;
- a plurality of straps extending from each of a left side and a right side of the flexible wall panel; and
- a plurality of G-hook buckles, each said buckle connected to a different strap of the plurality of straps, wherein the G-hook buckles connected to the plurality of straps extending from the left side of the flexible wall panel are removably receivable in the right anchor loops of a first flexible leg sleeve of the three flexible leg sleeves to secure the left side of the flexible wall panel to said first flexible leg sleeve, and the G-hook buckles connected to the plurality of straps extending from the right side of the flexible wall panel are removably receivable in the left anchor loops of a second flexible leg sleeve of the three flexible leg sleeves to secure the right side of the wall panel to said second flexible leg;
- a flexible floor panel having three vertices;
- three floor panel straps, each said floor panel strap secured to a respective vertex of the flexible floor panel;
- a secondary anchor loop secured to an inboard portion of a lower end of each said flexible leg sleeve facing the interior space when the respective flexible leg sleeve is engaged with the respective leg of the portable tripod, wherein each said secondary anchor loop defines a horizontal axis when the flexible leg sleeve to which the secondary anchor loop is secured is engaged with the respective leg of the tripod;
- a G-hook buckle connected to each said floor panel strap, each said G-hook buckle removably receivable in the secondary anchor loop of one of the flexible leg sleeves to secure the floor panel to the flexible leg sleeves;
- wherein the wall panel is configured to screen an object stowed on the floor panel from a viewpoint outboard of the wall panel, and provides an upright, load bearing surface to which a user can selectably mount an item of modular light-weight load-carrying equipment when each of the flexible leg sleeves is engaged with one of the legs of the portable tripod, the G-hook buckles connected to the floor panel straps are received in the respective secondary anchor loops, the G-hook buckles connected to the wall panel straps are received in the respective left and right anchor loops, and the portable tripod is in a deployed position.

* * * * *